(12) United States Patent
Sakhnini et al.

(10) Patent No.: US 11,617,178 B2
(45) Date of Patent: Mar. 28, 2023

(54) SIB PDSCH BEAM CLUSTERING FOR INITIAL ACCESS INFORMATION

(71) Applicant: QUALCOMM Incorporated, San Diego, CA (US)

(72) Inventors: Iyab Issam Sakhnini, San Diego, CA (US); Tao Luo, San Diego, CA (US); Xiaoxia Zhang, San Diego, CA (US); Jing Sun, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/236,911

(22) Filed: Apr. 21, 2021

(65) Prior Publication Data

US 2022/0361158 A1 Nov. 10, 2022

(51) Int. Cl.
*H04W 72/04* (2009.01)
*H04W 72/044* (2023.01)
*H04W 72/1273* (2023.01)

(52) U.S. Cl.
CPC ..... *H04W 72/046* (2013.01); *H04W 72/1273* (2013.01)

(58) Field of Classification Search
CPC ... H04W 72/04; H04W 72/046; H04W 72/12; H04W 72/1273; H04W 72/1289
See application file for complete search history.

(56) References Cited

U.S. PATENT DOCUMENTS

| 2011/0235584 | A1* | 9/2011 | Chen | H04L 1/008 370/328 |
| 2019/0182807 | A1* | 6/2019 | Panteleev | H04L 5/0046 |
| 2019/0253220 | A1* | 8/2019 | Kim | H04L 5/0044 |
| 2020/0178231 | A1 | 6/2020 | Zhang et al. | |
| 2020/0260475 | A1* | 8/2020 | Yoshimura | H04L 27/261 |
| 2020/0288479 | A1 | 9/2020 | Xi et al. | |
| 2021/0259001 | A1* | 8/2021 | Park | H04L 5/0053 |
| 2022/0053544 | A1* | 2/2022 | Kang | H04B 17/373 |
| 2022/0053546 | A1* | 2/2022 | Shi | H04B 7/0408 |

FOREIGN PATENT DOCUMENTS

WO 2020160692 A1 8/2020

OTHER PUBLICATIONS

International Search Report and Written Opinion—PCT/US2022/021811—ISA/EPO—dated Jul. 4, 2022.

\* cited by examiner

*Primary Examiner* — Kan Yuen

(74) *Attorney, Agent, or Firm* — Procopio, Cory, Hargreaves & Savitch

(57) ABSTRACT

A base station may determine one or more parameters of a PDSCH group including multiple PDSCHs for each beam in a plurality of beams, configure a plurality of resources for communication via the PDSCH group based on the determined one or more parameters of the PDSCH group, and transmit, to a UE, an indication of at least one parameter of the one or more parameters of the PDSCH group via the plurality of resources. The base station may also transmit, via the plurality of resources, one or more PDSCHs based on the at least one parameter of the one or more parameters of the PDSCH group. The UE may receive the indication of at least one parameter of the PDSCH group including multiple PDSCHs for each beam in a plurality of beams, and receive, from the base station, one or more PDSCHs based on the indication.

28 Claims, 14 Drawing Sheets

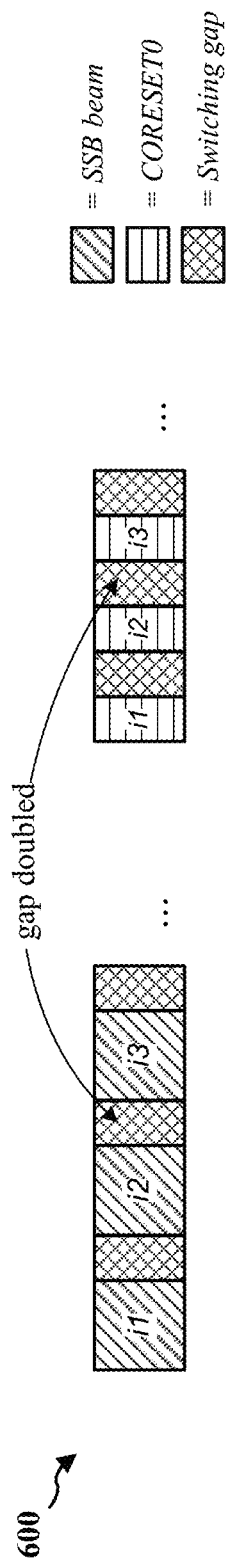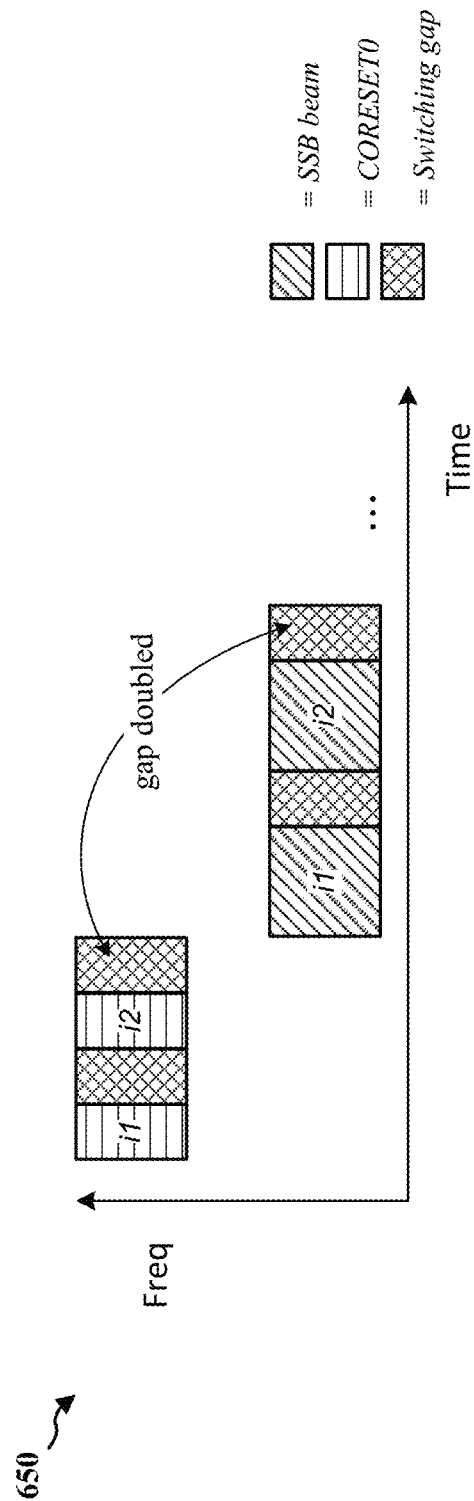
FIG. 6A
FIG. 6B

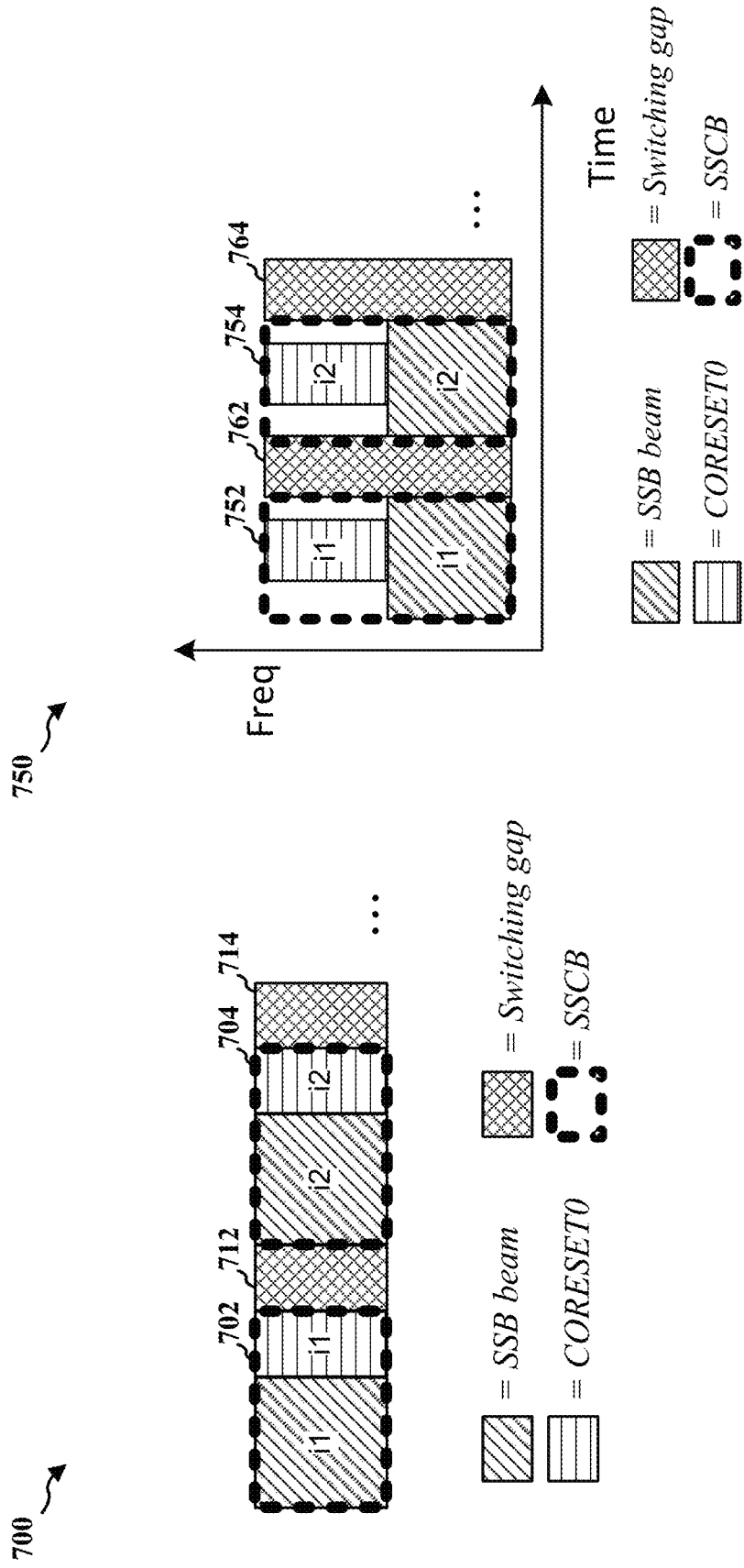

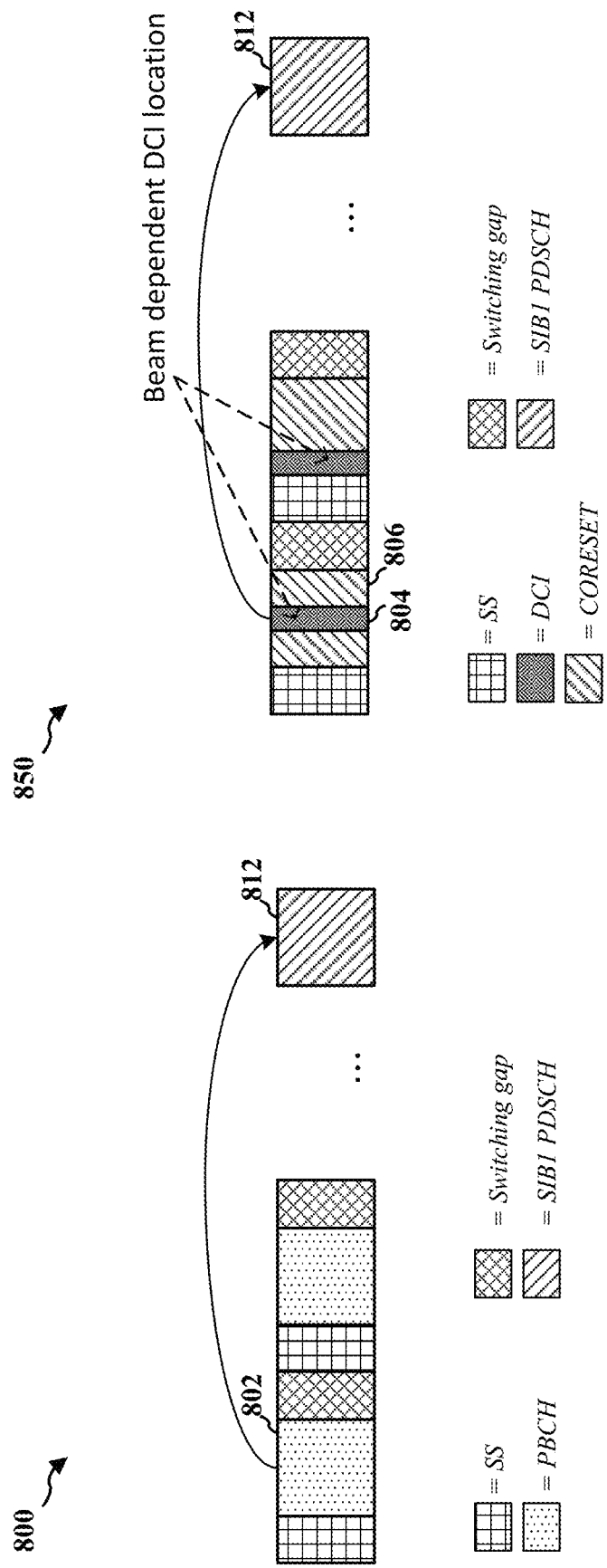

SIB PDSCH BEAM CLUSTERING FOR INITIAL ACCESS INFORMATION

BACKGROUND

Technical Field

The present disclosure relates generally to communication systems, and more particularly, to a wireless communication including a system information block (SIB) physical downlink shared channel (PDSCH) group.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include a base station and a user equipment (UE). The base station may determine one or more parameters of a PDSCH group including multiple PDSCHs for each beam in a plurality of beams, the one or more parameters of the PDSCH group including at least one of a starting time of the PDSCH group, a time period between the multiple PDSCHs of different beams in the plurality of beams, a symbol length of PDSCHs of different beams in the plurality of beams, or a bandwidth of the PDSCH group, configure a plurality of resources for communication via the PDSCH group based on the determined one or more parameters of the PDSCH group, and transmit, to the UE, an indication of at least one parameter of the one or more parameters of the PDSCH group for communication via the plurality of resources. The base station may also transmit, to the UE via the plurality of resources, one or more PDSCHs based on the at least one parameter of the one or more parameters of the PDSCH group.

The UE may receive, from the base station, the indication of at least one parameter of the PDSCH group including multiple PDSCHs for each beam in a plurality of beams, and receive, from the base station via the plurality of resources, one or more PDSCHs based on the indication of the at least one parameter of the PDSCH group.

In one aspect, the PDSCH group may include a SIB PDSCH. In one aspect, the time period between the multiple PDSCHs of different beams may include beam switching gaps of the plurality of beams. In one aspect, at least one parameter of one or more parameters of the PDSCH group may be preconfigured or predefined.

The base station may further transmit, to the UE, a synchronization signal (SS) cluster for each beam in the plurality of beams, the SS cluster including at least one of a physical broadcast channel (PBCH) or a control resource set (CORESET). The UE may receive, from the base station, the SS cluster for each beam in the plurality of beams.

In one aspect, at least one of the PBCH or the CORESET may include at least one indication of at least one parameter of the one or more parameters of the PDSCH group. In another aspect, at least one indication of at least one parameter of the one or more parameters of the PDSCH group is configured for the plurality of beams. In another aspect, at least one indication of at least one parameter of the one or more parameters of the PDSCH group is configured for a subset of beams of the plurality of beams. In another aspect, at least one indication of at least one parameter of the one or more parameters of the PDSCH group is configured specifically for each beam of the plurality of beams.

In one aspect, at least one indication of at least one parameter of the one or more parameters of the PDSCH group may include an index to a set of one or more parameters. In another aspect, the starting time of the PDSCH group may include an absolute time domain value. In another aspect, the starting time of the PDSCH group may include a relative time domain value in reference to the SS cluster. In one aspect, the bandwidth of the PDSCH group may include an absolute frequency-domain value. In another aspect, the bandwidth of the PDSCH group may include a relative time domain value in reference to the SS cluster.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 6A and 6B illustrate examples of SSB/CORESET patterns, including beam switching gaps.

FIGS. 7A and 7B illustrate examples of an initial access structure of a method of wireless communication.

FIGS. 8A and 8B illustrate examples of an initial access structure of a method of wireless communication.

DETAILED DESCRIPTION

Figure 1:
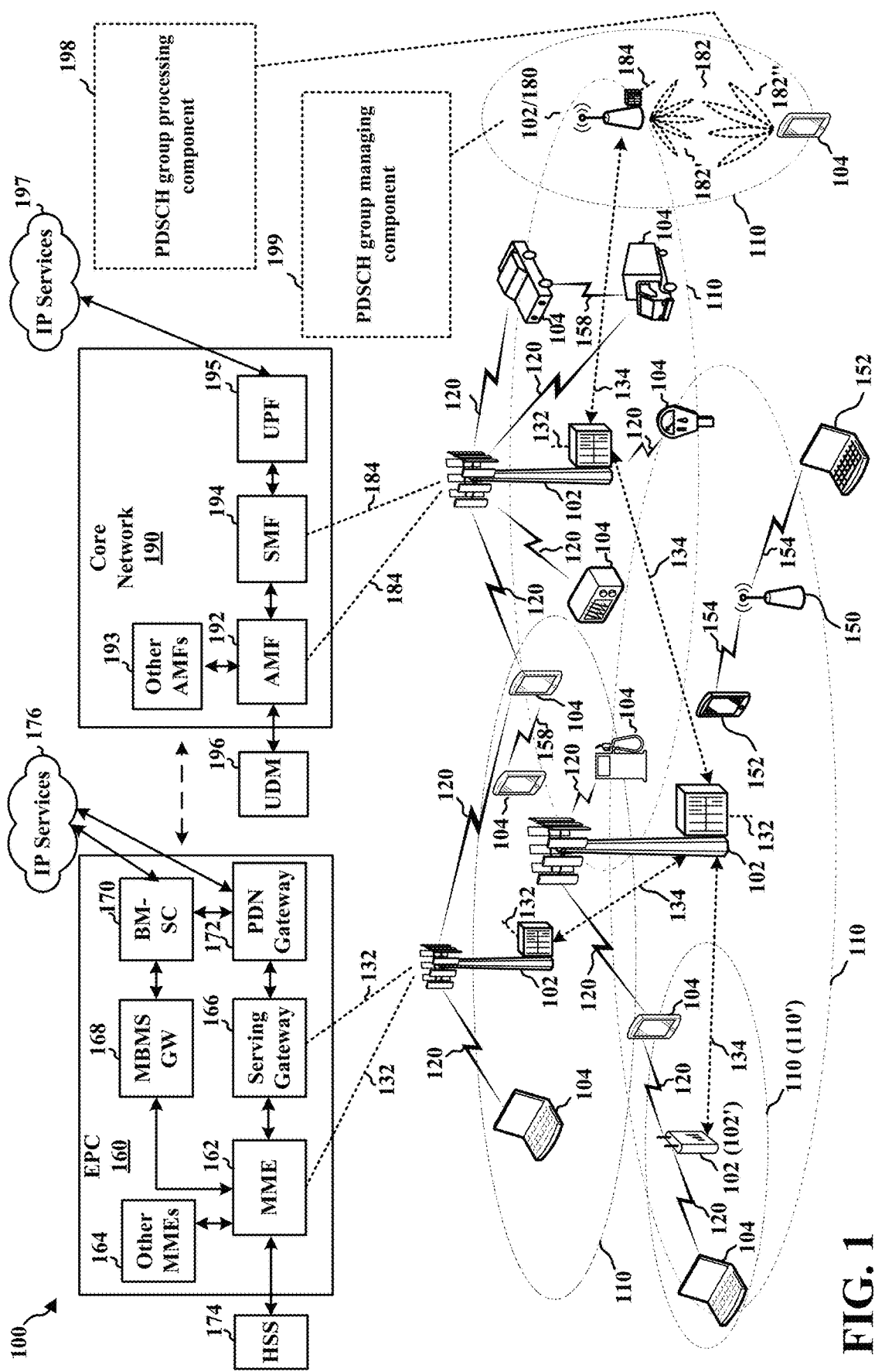
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer-executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell), and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a PDSCH group processing component 198 configured to receive, from a base station, an indication of at least one parameter of a PDSCH group including multiple PDSCHs for each beam in a plurality of beams, the at least one parameter of the PDSCH group including at least one of a starting time of the PDSCH group, a time period between PDSCHs of different beams in the plurality of beams, a symbol length of PDSCHs of different beams in the plurality of beams, or a bandwidth of the PDSCH group, and receive, from the base station via a plurality of resources, one or more PDSCHs based on the indication of the at least one parameter of the PDSCH group. In certain aspects, the base station 180 may include a PDSCH group managing component 199 configured to determine one or more parameters of a PDSCH group including multiple PDSCHs for each beam in a plurality of beams, the one or more parameters of the PDSCH group including at least one of a starting time of the PDSCH group, a time period between the multiple PDSCHs of different beams in the plurality of beams, a symbol length of PDSCHs of different beams in the plurality of beams, or a bandwidth of the PDSCH group, configure a plurality of resources for communication via the PDSCH group based on the determined one or more parameters of the PDSCH group, and transmit, to a UE, an indication of at least one parameter of the one or more parameters of the PDSCH group for communication via the plurality of resources. Although the following description may be focused on 5G NR, the concepts described herein may be applicable to other similar areas, such as LTE, LTE-A, CDMA, GSM, and other wireless technologies.

Figures 2A, 2B, 2C, 2D:
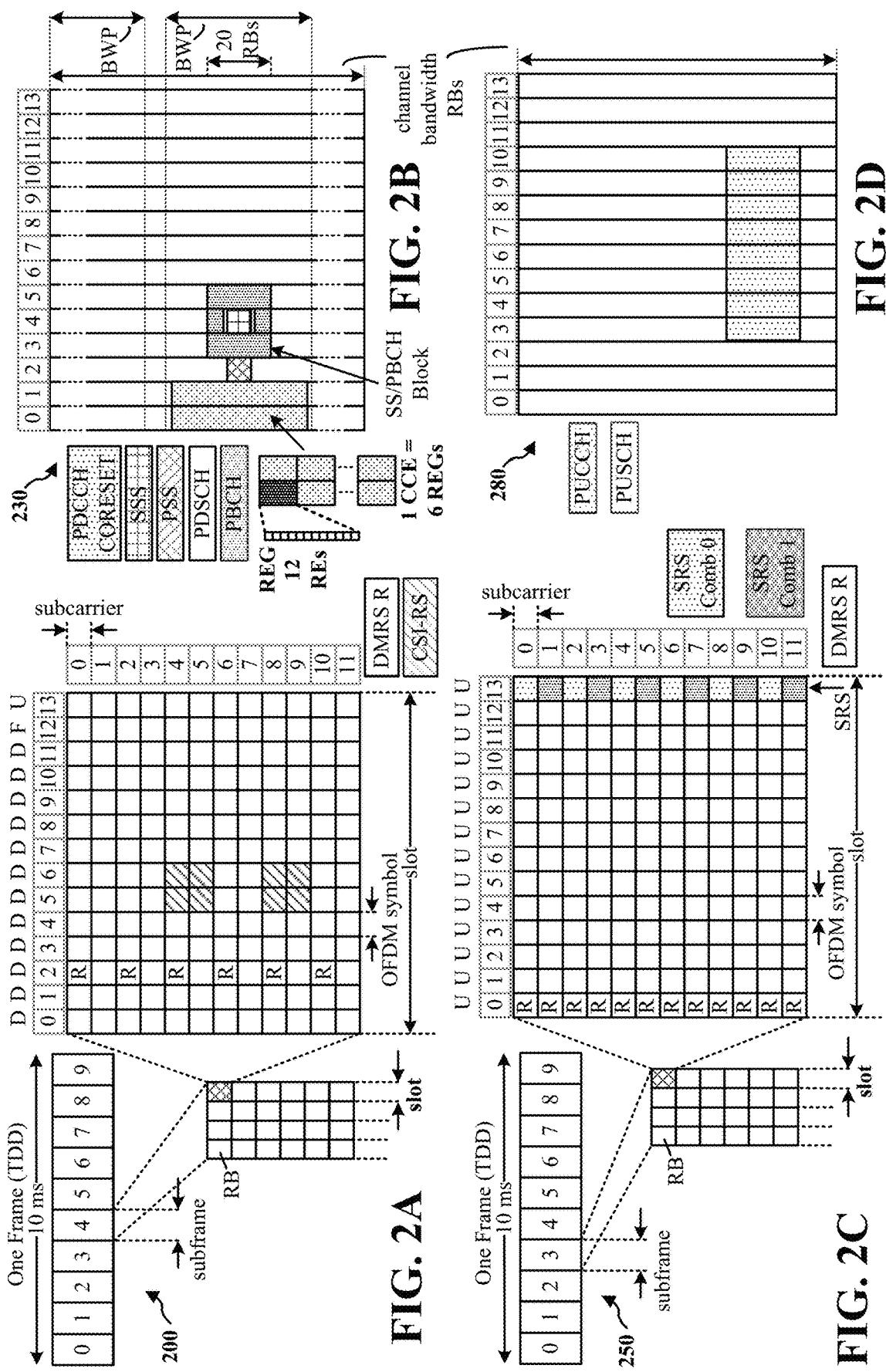
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency-division duplexed (FDD) in which for a particular set of subcarriers (carrier system bandwidth), subframes within the set of subcarriers are dedicated for either DL or UL, or may be time-division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency-division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH, such as system information blocks (SIBs) and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
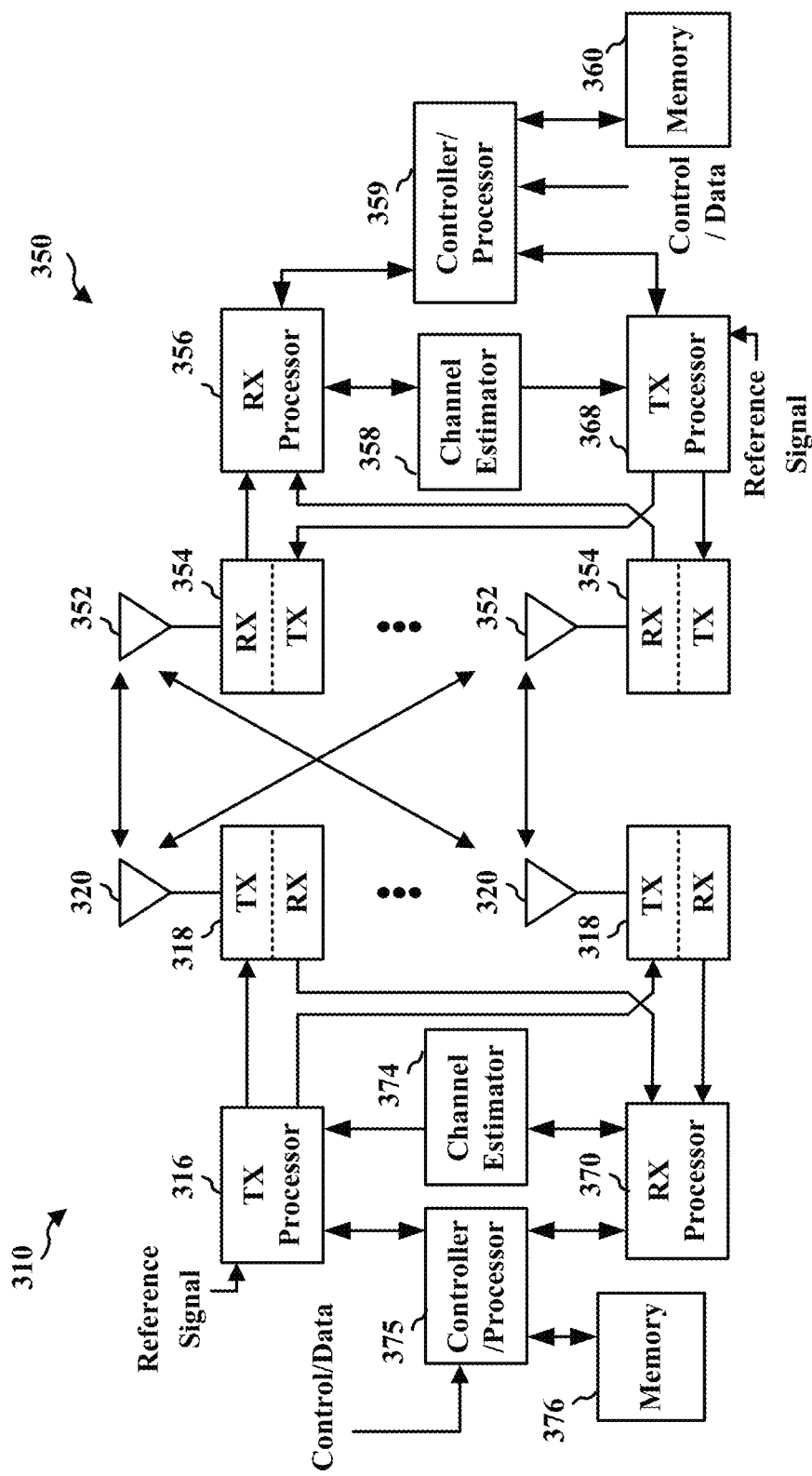
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354 TX. Each transmitter 354 TX may modulate an RF carrier with a respective spatial stream for transmission.

The UL transmission is processed at the base station 310 in a manner similar to that described in connection with the receiver function at the UE 350. Each receiver 318 RX receives a signal through its respective antenna 320. Each receiver 318 RX recovers information modulated onto an RF carrier and provides the information to an RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1. At least one of the TX processor 316, the RX processor 370, and the controller/processor 375 may be configured to perform aspects in connection with 199 of FIG. 1.

Figure 4:
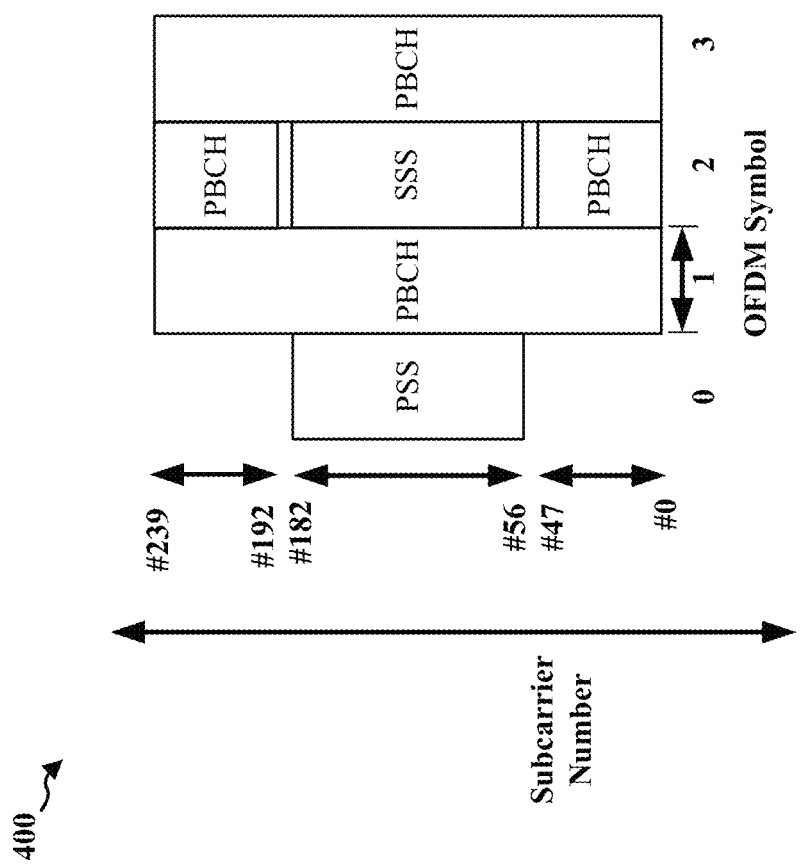
FIG. 4 illustrates an example SSB 400 of a method of wireless communication.

In some wireless communication systems, a base station may transmit an SSB that receiving UEs may use for an initial cell search. In some aspects, the UE may use the PSS/SSS/PBCH/DMRS signals in the SSB to refine the frequency offset estimation. FIG. 4 illustrates an example SSB 400 of a method of wireless communication. The SSB 400 may span 4 OFDM symbols with 1 symbol for a PSS, 2 symbols for a PBCH, and 1 symbol with an SSS and a PBCH frequency domain multiplexed with each other. By way of example, in some wireless communication systems, an SCS of 15 kHz or 30 kHz may be used for FR1 and SCS of 120 kHz or 240 kHz may be used for FR2. The PSS may use a length 127 frequency domain-based M-sequence (mapped to 127 subcarriers). For example, the PSS may have 3 possible sequences. The SSS may use a length 127 frequency domain-based Gold Code sequence (e.g., 2 M-sequences) (mapped to 127 subcarriers). By way of example, there may be a total of 1008 possible sequences for the SSS. The PBCH may be QPSK modulated, and the UE may coherently demodulate the PBCH using an associated DM- RS from the base station. During an initial search, a UE searcher may use a sliding window and correlation technique to look for the PSS. For each timing hypothesis associated with the sliding window, the UE may try all 3 possible PSS sequences and N frequency domain hypothesis to account for Doppler, internal clock frequency shifts, and any other frequency errors.

The base station may generate the PSS based on an M-sequence and transmit the PSS to the UE. In some aspects, the PSS may be represented as d(n)=1−2x(m). The PSS may be determined as one sequence out of three (3) possible sequences. The PSS sequence may have a sequence length of 127, and the PSS may have a one (1) symbol) length. The PSS sequence may be determined based on a cell ID part 2, $N_{ID}^{(2)}$, of the cell associated with the PSS. In some aspects, m may be determined as m=(n+43$N_{ID}^{(2)}$)mod 127, where 0≤n<127. The cell ID part 2 may have 1 value out of three (3) possible values. For example, the cell ID part 2 may be represented as $N_{ID}^{(2)}$=0, 1, 2. Accordingly, the UE may use the PSS to estimate the timing/frequency synchronization. That is, the UE may use the PSS to perform at least one of a symbol timing estimation, an initial frequency offset estimation or a generation of a cell identity (ID) part 2 of the cell associated with the PSS.

The SSS may be generated based on two (2) M-sequences, $m_0$ and $m_1$, i.e., the Gold code. The SSS may be represented as d(n)=[1−2$x_0$((n+$m_0$)mod 127)][1−2$x_1$((n+$m_1$)mod 127)]. The SSS may be determined as one sequence out of 336 possible sequences. The SSS sequence may have a sequence length of 127, and the PSS may have a one (1) symbol length. The SSS sequence may be determined based on a cell ID part 1, $N_{ID}^{(1)}$, and the cell ID part 2, $N_{ID}^{(2)}$, of the cell associated with the SSS. In some aspects, $m_0$ may be determined as $$m_0 = 3\left[\frac{N_{ID}^{(1)}}{112}\right] + N_{ID}^{(2)},$$

and $m_1$ may be determined as $m_1=N_{ID}^{(1)}$mod 112+$m_0$+1. The SSS may be determined as one sequence of 336 possible sequences. The cell ID part 1 may have 1 value out of 336 possible values. For example, the cell ID part 1 may be represented as $N_{ID}^{(1)}$=0, 1, 2, . . . , 225. Accordingly, the UE may use the SSS after estimating the timing/frequency synchronization based on the PSS to generate the cell ID part 1 of the cell associated with the SSS.

Accordingly, the UE may generate the physical cell ID as represented as $N_{ID}^{cell}$=3$N_{ID}^{(1)}$+$N_{ID}^{(2)}$ based on the cell ID part 1 determined based on the SSS and the cell ID part 2 determined based on the PSS.

The PBCH may carry the MIB and may be QPSK modulated. The UE may coherently demodulate the PBCH using an associated DM-RS from the base station. Referring to FIG. 4, the PBCH may include 576 Res, i.e., 240×2+48+48.

The PBCH DM-RS may function as a reference signal for decoding the PBCH. The UE may use the PBCH DM-RS for channel estimation of the PBCH to demodulate the PBCH. For FR2, the PBCH DM-RS may carry the 3 least significant bits (LSBs) of the SSB index per half frame from the DMRS sequence index. The PBCH DM-RS REs may be interleaved with the PBCH data every $4^{th}$ subcarrier (SC). In one aspect, the DM-RS may include 144 Res, i.e., 60×2+12+12. In one aspect, the total number of bits of the PBCH may be 31 for FR2. In one aspect, the PBCH for FR2 may include the following fields.

TABLE 1

| < Fields of PBCH for FR2 > | |
|---|---|
| MIB | |
| System frame number (SFN) | 6 bits |
| Subcarrier spacing (SCS) common | 1 bit (15 or 60, 30 or 160) |
| System signal block (SSB) SC offset | 4 bits |
| DMRS type A position | 1 bit |
| Pdcch-ConfigSIB1 | |
| controlResourceSetZero | 4 bits |
| searchSpaceZero | 4 bits |
| Cell barred | 1 bit |
| IntraFreq Reselection | 1 bit |
| Spare | 1 bit |
| PBCH multiplexed bits in L1 | |
| SFN | 4 bits |
| Half-frame bit | 1 bit |
| master signal block (MSB) of SSB index | |

In some aspects, the MIB carried in the PBCH may include an indication of at least one CORESET. At least one CORESET may include a CORESET0 configured to schedule the SIB1. In one aspect, the MIB may include a parameter pdcch-ConfigSIB1 including 4 bits of a controlResourceSetZero field indicating CORESET0 and 4 bits of a searchSpaceZero field indicating search space set 0. That is, the 4 bits of the controlResourceSetZero field may determine the multiplexing pattern and frequency offset, the number of RBs, or the number of symbols of the CORESET0. The 4 bits of the searchSpaceZero field may determine the CORESET0 time location, e.g., the value of 0 is used for multiplexing patterns 2 and 3.

The base station may send a grant for a system information block type 1 (SIB1) PDSCH in DCI format 1_0 with a cyclic redundancy check (CRC) scrambled by a system information radio network temporary identifier (RNTI) (SI-RNTI). Here, the SIB1 may refer to the SIB that may be carrying the cell access information. The base station may send the DCI using the PDCCH type0 on the search space set 0 on CORESET0. In some aspects, the total number of bits for the DCI format 1_0 may be 37, 39, or 41 bits. In one aspect, the DCI format 1_0 may include the following fields.

TABLE 2

| < DCI format 1_0 fields > | | |
|---|---|---|
| Field | Number of bits | comments |
| frequency domain resource assignment (FDRA) | 9, 11, 13 bits (for 24, 48, 96 RBs) | $\log_2(N_{RB}(N_{RB} + 1)/2)$, $N_{RB}$ = size of CORESET0 |
| time domain resource assignment (TDRA) | 4 bits | |

TABLE 2-continued

< DCI format 1_0 fields >

| Field | Number of bits | comments |
| --- | --- | --- |
| Virtual resource block (VRB) to physical resource block (PRB) mapping | 1 bit | 0 = non-interleaved<br>1 = interleaved |
| Modulation and coding scheme (MCS) | 5 bits | |
| Redundancy version (RV) | 2 bits | |
| System information (SI) indicator | 1 bit | 0 = SIB1, 1 = SI message |
| Reserved bits | 15 bits | |

In some aspects, the SSB symbol and the CORESET0 symbol for FR2 may be multiplexed to have various multiplexing patterns. In one aspect, the SSB symbol and the CORESET0 symbol may be time-division multiplexed, i.e., multiplexing pattern 1. In another aspect, the SSB symbol and the CORESET0 symbol may use different SCSs, and may be frequency-division multiplexed and time-division multiplexed, i.e., using multiplexing pattern 2. In another aspect, the SSB symbol and the CORESET0 symbol may use the same SCS and may be frequency-division multiplexed, i.e., using multiplexing pattern 3. The MIB may carry the pdcch-ConfigSIB1 parameter, including the controlResourceSetZero field (4 bits) and the searchSpaceZero field (4 bits). The controlResourceSetZero field may indicate the multiplexing pattern and the CORESET0 frequency offset, the number of RBs, and the number of symbols, and the searchSpaceZero field may indicate the CORESET0 time location. In one aspect, the searchSpaceZero field may have a value 0 for multiplexing patterns 2 and 3. In some aspects, the CORESET0 may be 1, 2, or 3 symbols long and have 24, 48, or 96 RBs.

In some aspects, higher NR operating bands may have larger bandwidths, and the higher operating frequency bands may cause higher residual noise. To address the noise, more lenient SCSs may be provided for the higher operating band, and several designs of the waveform may be provided for the DL operation for higher NR operating bands having larger bandwidths. In one aspect, a single carrier frequency domain implementation, e.g., DFT-s-OFDM, may have a low peak-to-average power ratio (PAPR) that may provide better coverage, support a single tap frequency domain equalization (FDE), or an efficient BW utilization from not having a guard band. In another aspect, a single carrier time domain implementation, e.g., SC-QAM, may have a lower PAPR which may provide better coverage, or a low complexity implementation from not having an FFT/IFFT. In another aspect, an OFDM may have a higher PAPR that may cause distortion of a signal, a higher SNR, a higher spectral efficiency, a higher order MIMO to achieve relatively higher data rate, a single tap FDE, an efficient BW utilization from not having a guard band, and an easier FDM capability.

Figure 5A:
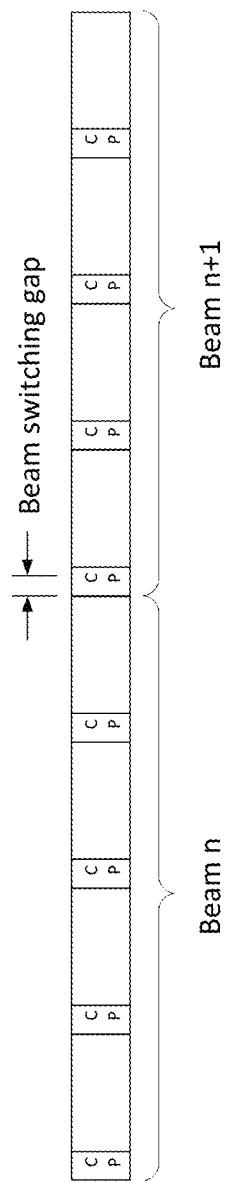
FIGS. 5A and 5B illustrate examples of beam switching.
Figure 5B:
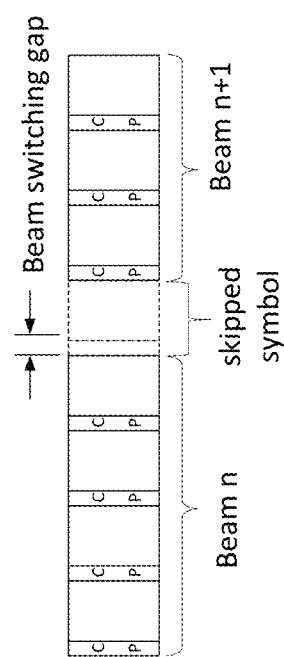

FIGS. 5A and 5B illustrate examples of beam switching. FIG. 5A includes a first example 500 with a beam switching gap absorbed by a CP, and FIG. 5B includes a second example 550 with a beam switching gap longer than the CP.

In some aspects, the higher operation bands may have increased SCS, e.g., 960 kHz, 1920 kHz, or 3840 kHz, to reduce phase noise and to increase the overall channelization bandwidth with a manageable FFT size. In some aspects, increasing the SCS may proportionally decrease the symbol time and the CP. Table 3 may provide examples of the CP length ($T_{CP}$) and the symbol time ($T_{symb}$) associated with the SCS.

TABLE 3

< Examples of $T_{CP}$ and $T_{symb}$ associated with the SCS >

| u | 0 | 1 | 2 | 3 | 4 | 5 | 6 | 7 | 8 |
| --- | --- | --- | --- | --- | --- | --- | --- | --- | --- |
| SCS (kHz) | 15 | 30 | 60 | 120 | 240 | 480 | 960 | 1920 | 3840 |
| $T_{CP}$ (ns) | 4687.5 | 2343.8 | 1171.9 | 585.9 | 293.0 | 146.5 | 73.2 | 36.6 | 18.3 |
| $T_{symb}$ (ns) | 66666.7 | 33333.3 | 16666.7 | 8333.3 | 4166.7 | 2083.3 | 1041.7 | 520.8 | 260.4 |

Beam switching gaps may be provided between consecutive SSB beams to facilitate the beam switching. That is, to switch between different SSB beams, a beam switching gap may be provided between the two different SSB beams. In some aspects, the CP length may be long enough to absorb the beam switching gap. Referring to the first example 500, the beam switching gaps may be approximately 100 ns. The CP length may be long enough, e.g., greater than 100 ns, to absorb the SSB beam switching gap. Accordingly, the CP may absorb the SSB beam switching gap, and the beam may be switched from the beam n to the beam n+1 without a beam switching gap.

In some aspects, higher operation bands with higher SCS may have relatively shorter CP length and symbol time, and the CP length may not be long enough to absorb the beam switching gap. The second example 550 may be for higher bands, i.e., higher SCS, and may have relatively shorter symbol times and CP length. The CP length may not be long enough to absorb the beam switching gap within the CP. For example, for the SCS=3840 kHz, the CP length may be 18.3 ns, which is shorter than the beam switching gap, which may be approximately 100 ns. Accordingly, the beam switching gap may become considerably increased in length compared to the symbol length and also result in a larger signaling overhead and increased wasted resources. In some aspects, a gap may be provided to extend to the symbol level resolution. In one aspect, referring to the second example 550, the first SSB symbol for the beam n+1 may be skipped to accommodate the beam switching gap that is larger than the CP length.

FIGS. 6A and 6B illustrate examples of SSB/CORESET patterns, including beam switching gaps. FIG. 6A illustrates the example 600 of SSB/CORESET pattern using a multiplexing pattern 1, and FIG. 6B illustrates an example 650 of the SSB/CORESET pattern using a multiplexing pattern 2. In some aspects, the CORESET may include CORESET0.

The higher operation bands with higher SCS may have relatively shorter CP length and symbol time, and a beam switching gap may be provided between different beams. In some aspects, using the multiplexing pattern 1, where the CORESET0 is time-division multiplexed with the SSB, the beam switching gaps may be provided between each SSB beam as well as each CORESET0 of different beams. That is, the beam switching gaps may be provided between the SSB beams and between CORESET0 of different beams, doubling the wasted resources in the time domain to provide the beam switching gaps, i.e., 600. In some aspects, using the multiplexing pattern 2, where the CORESET0 is frequency-division multiplexed and time-division multiplexed, the beam switching gaps may be provided between each SSB beams as well as each CORESET0 of different beams may still double the wasted resourced in the time domain to provide the beam switching gaps, i.e., 650. In some aspects, using the multiplexing pattern 3, where the CORESET0 is frequency-division multiplexed, the beam switching gaps may be provided between the SSB beams and between CORESET0 of different beams without doubling the wasted resources in the time domain. However, using the multiplexing pattern 3 may not be applicable in single carrier waveform cases, e.g., in a single carrier QAM (SC-QAM).

In some aspects, initial access structures carrying initial access information messages having various patterns of at least one of the SS, the PBCH, the CORESET, and/or the SIB may be provided to reduce the beam switching gap in the higher operation bands. Here, the initial access structure may refer to the channel/message that carries the information message that may be received from the base station for the UE to perform the initial access procedure.

FIGS. 7A and 7B illustrate examples of an initial access structure of a method of wireless communication. FIG. 7A illustrates an example 700 including the SSB and the CORESET grouped in the time domain in a single block. That is, the example 700 may include an SSB/CORESET block (SSCB) including the SSB and the CORESET of the same beam time-division multiplexed in a single block. In some aspects, the CORESET may include CORESET0. The SS, the PBCH, and the CORESET0 in the SSCB may be associated with the same beam, and the SSCB may omit beam switching gaps between the SS, the PBCH, and the CORESET0 in the SSCB. The switching gaps may be provided between the SSCBs for different beams. The example 700 may provide that a first beam switching gap 712 is provided after a first SSCB 702 for a first beam and before a second SSCB 704 for a second beam and that a second beam switching gap 714 is provided after the second SSCB 704 for the second beam.

FIG. 7B illustrates an example 750, including the SSB and the CORESET grouped in the frequency domain in a single block. That is, the example 750 may include an SSCB including the SSB and the CORESET of the same beam frequency-division multiplexed in a single block. In some aspects, the CORESET may include CORESET0. The SS, the PBCH, and the CORESET0 associated with the same beam may be included in the SSCB, and the SSCB may share a single beam switching gap after the SSCB. The switching gaps may be provided between the SSCBs for different beams. The example 750 may provide that a first beam switching gap 762 is provided after a first SSCB 752 for a first beam and before a second SSCB 754 for a second beam, and that a second beam switching gap 764 is provided after the second SSCB 754 for the second beam.

FIGS. 8A and 8B illustrate examples of an initial access structure of a method of wireless communication. In some aspects, the contents of PBCH/MIB and DCI 1_0 (with SI-RNTI) may be consolidated in a single message/channel to reduce the CRC overhead. That is, at least one channel/message structure that combines the information in both PBCH/MIB and DCI 1_0 with a CRC scrambled with SI-RNTI may be provided. Here, the combined information from the PBCH/MIB and DCI 1_0 may refer to as the initial access information message. FIG. 8A illustrates an example 800, including a PBCH 802 carrying the initial access information message. That is, the PBCH 802 may carry the scheduling information for the SIB1 PDSCH 812. FIG. 8B illustrates an example 850 that may carry the initial access information message using a message similar to DCI 804 using a PDCCH sent on a CORESET/search space 806. That is, the example 850 may include the CORESET 806 carrying the DCI 804 with the scheduling information for the SIB1 PDSCH 812.

In some aspects, SIB1 may refer to the SIB that may be carrying the cell access information. That is, the SIB1 PDSCH may be scheduled using DCI 1_0 with SI-RNTI transmitted on search space 0 within CORESET0.

The DCI may include a start and length indicator value (SLIV) for scheduling the SIB1 PDSCH, and the SLIV may indicate an index into a table. In one aspect, the table may be a default PDSCH time domain resource allocation table. Based on the SLIV, the time domain resource assignment (TDRA) and the frequency domain resource assignment (FDRA) for the SIB1 PDSCH for each beam maybe be signaled separately. However, in single carrier waveforms, time-division multiplexing may be used to multiplex messages, and frequency-division multiplexing may not be available.

In one aspect, the DCI 1_0 and MIB (or SSB and CORESET0) may be merged to provide a relatively lighter TDRA and time-domain allocation techniques for the SIB1 PDSCH to reduce the signaling bits. In another aspect, the DCI and the scheduled SIB1 PDSCH may be provided in the same slot. In another aspect, the beam switching gap may be provided between SIB1 PDSCHs of different beams. In another aspect, the base station may complete the SIB1 beam sweep in a short time to increase the scheduling flexibility for other messages.

Figure 9:
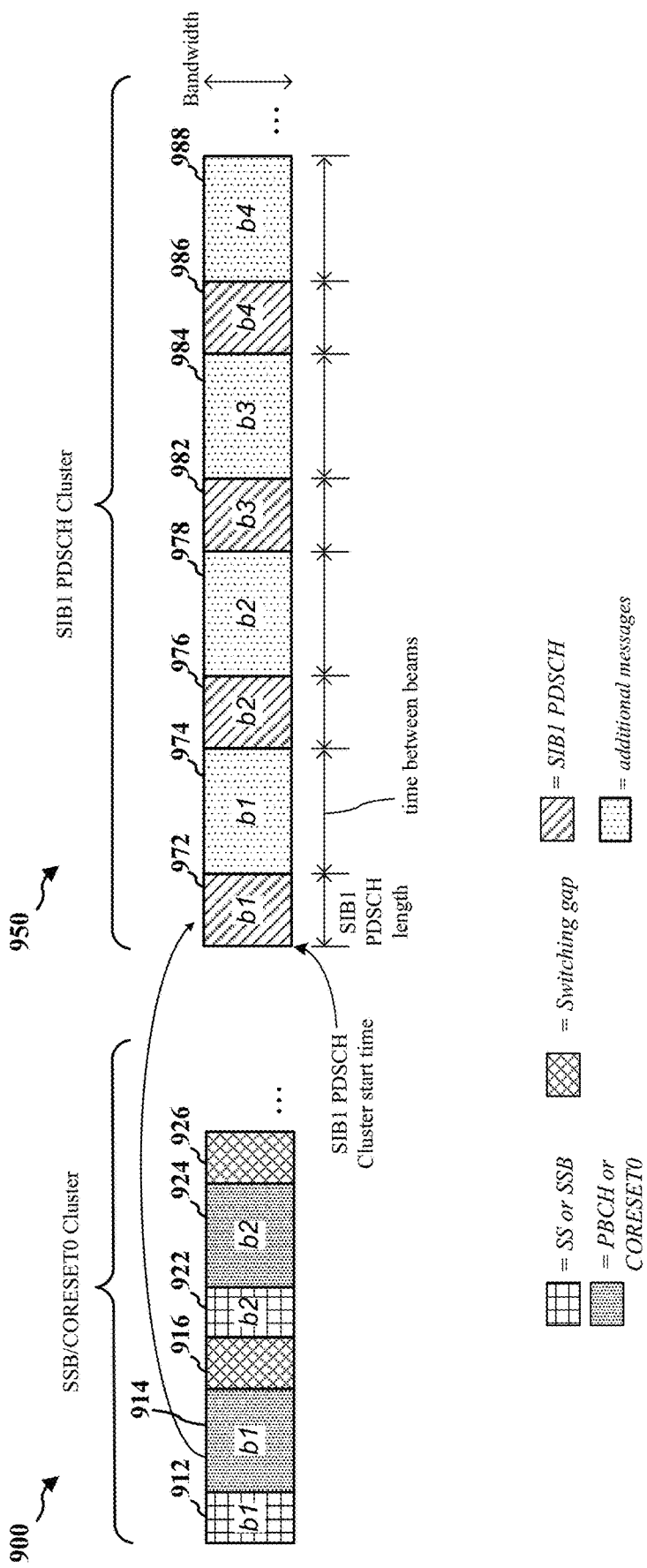
FIG. 9 illustrates examples of a PDSCH cluster for a method of wireless communication.

FIG. 9 illustrates examples of a PDSCH cluster for a method of wireless communication. FIG. 9 includes an example of an SSB/CORESET cluster 900 and an example of a SIB PDSCH cluster 950. The example of an SSB/CORESET cluster 900 may include an SS or an SSB (SS/SSB), a PBCH or a CORESET (PBCH/CORESET), or a switching gap. That is, the example of an SSB/CORESET cluster 900 may include a first SS/SSB 912, a first PBCH/CORESET 914 time-division multiplexed with the first SS/SSB, or a switching gap 916 time-division multiplexed with the first PBCH/CORESET 914. The example of SSB/CORESET cluster 900 may also include a second SS/SSB 922, a second PBCH/CORESET 924 time-division multiplexed with the first SS/SSB, or a switching gap 926 time-division multiplexed with the second PBCH/CORESET 924. In some aspects, the SS/SSB of the SSB/CORESET cluster may include scheduling information of the corresponding PBCH/CORESET. The first SS/SSB 912 may include scheduling information of the first PBCH/CORESET 914, and the second SS/SSB 922 may include scheduling information of the second PBCH/CORESET 924. In some aspects, the PBCH/CORESET may carry the initial access information message. That is, the PBCH/CORESET may carry the scheduling information for the corresponding SIB1 PDSCH of the SIB PDSCH cluster. The scheduling information for the SIB1 PDSCH may include at least one parameter of the corresponding SIB1 PDSCH.

In some aspects, the SIB PDSCH cluster 950 may include one or more SIB1 PDSCHs 972, 976, 982, and 986 for multiple beams formed into a cluster based on at least one parameter. At least one parameter may include a starting time of the SIB PDSCH cluster, a length, i.e., a number of symbols, of each PDSCH of different beams, or a bandwidth of the SIB PDSCH cluster. The starting time of the SIB PDSCH cluster may be represented in a form of SFN, slot, or symbol. At least one parameter may also include an additional time allocated for an additional message or switching gap 974, 978, 984, and 988 between each PDSCH of different beams. In some aspects, the additional time may include the beam switching gap between each PDSCH of different beams.

At least one parameter of the SIB PDSCH cluster may be indicated in various formats. In one aspect, at least one parameter of the SIB PDSCH cluster may be indicated explicitly. In another aspect, at least one parameter of the SIB PDSCH cluster may be indicated using an index to a specified table. That is, the UE and the base station may share the specified table including multiple options for at least one parameter of the SIB PDSCH cluster. In another aspect, at least one parameter of the SIB PDSCH cluster may be indicated as a combination of sending an explicit indication and using the index to the specified table.

In some aspects, the starting time of the SIB1 PDSCH cluster may be configured in various formats. In one aspect, the starting time of the SIB1 PDSCH cluster may be configured in terms of an absolute value. For example, the starting time of the SIB1 PDSCH cluster may be configured in terms of the SFN, the slot index, etc. In another aspect, the starting time of the SIB1 PDSCH cluster may be configured in terms of a relative value. For example, the starting time of the SIB1 PDSCH cluster may be configured relative to a certain reference time, e.g., an end of the SSB/CORESET0 cluster.

In some aspects, the bandwidth of the SIB1 PDSCH cluster may be configured in various formats. In one aspect, the bandwidth of the SIB1 PDSCH cluster may be configured in terms of an absolute value, e.g., frequency. In another aspect, the bandwidth of the SIB1 PDSCH cluster may be configured in terms of a relative value. For example, the bandwidth of the SIB1 PDSCH cluster may be configured relative to a bandwidth of a specific channel in the SSB/CORESET0 cluster, e.g., the SS, the SSB, the PBCH, or the CORESET0.

In some aspects, one or more parameters of the SIB PDSCH cluster may be configured in various ways. In one aspect, one or more parameters of the SIB PDSCH cluster may be specified. In another aspect, at least one parameter of the SIB PDSCH cluster may be configurable using a message/channel in the SSB/CORESET cluster. In another aspect, some of one or more parameters of the SIB PDSCH cluster may be specified, and the others of one or more parameters of the SIB PDSCH cluster may be configured by a message/channel in the SSB/CORESET cluster.

In some aspects, the message/channel of the SSB/CORESET cluster may indicate or configure one or more parameters of the SIB PDSCH cluster. In one aspect, one or more parameters of the SIB PDSCH cluster may be configured the same for all beams. The UE may decode the SSB/CORESET cluster and may derive the location of the corresponding SIB1 PDSCHs based on the beam indexes.

Referring to FIG. 9, the first PBCH/CORESET 914 may indicate or configure the one or more parameters of the SIB PDSCH cluster 950 to be the same for all beams. In one aspect, the first PDSCH/CORESET 914 may indicate or configure the same SIB1 PDSCH length and the same additional time between beams for all beams. Accordingly, the base station may schedule a first SIB1 PDSCH 972 for a first beam (b1), a second SIB1 PDSCH 974 for a second beam (b2), a third SIB1 PDSCH 982 for a third beam (b3), and a fourth SIB1PDSCH 986 for a fourth beam (b4) to have the same SIB1 PDSCH length, and a first additional message 974 for the first beam (b1), a second additional message 978 for the second beam (b2), a third additional message 984 for the third beam (b3), and a fourth additional message 988 for the fourth beam (b4) to have the same additional time. The UE may decode the first SIB1 PDSCH 972 for the first beam (b1), the second SIB1 PDSCH 974 for the second beam (b2), the third SIB1 PDSCH 982 for the third beam (b3), and the fourth SIB1 PDSCH 986 for the fourth beam (b4) based on the same SIB1 PDSCH length, and the first additional message 974 for the first beam (b1), the second additional message 978 for the second beam (b2), the third additional message 984 for the third beam (b3), and the fourth additional message 988 for the fourth beam (b4) based on the same additional time.

In another aspect, the one or more parameters of the SIB PDSCH cluster may be divided into two or more sub-clusters. For example, a first sub-cluster including SIB PDSCHs of the first set of beams may use the first set of configurations, and a second sub-cluster including SIB PDSCHs of the second set of beams may use the second set of configurations. In one aspect, the SSB/CORESET cluster 900 may indicate or configure a first SIB1 PDSCH length and a first additional time for the first beam (b1) and the second beam (b2), and a second SIB1 PDSCH length and a second additional time for the third beam (b3) and the fourth beam (b4). Accordingly, the base station may schedule the first SIB1 PDSCH 972 for the first beam (b1) and the second SIB1 PDSCH 974 for the second beam (b2) with the first SIB1 PDSCH length, the third SIB1 PDSCH 982 for the third beam (b3) and the fourth SIB1 PDSCH 986 for the fourth beam (b4) with the second SIB1 PDSCH length, the first additional message 974 for the first beam (b1) and the second additional message 978 for the second beam (b2) with the first additional time, and the third additional message 984 for the third beam (b3) and the fourth additional message 988 for the fourth beam (b4) with the second additional time. The UE may decode the first SIB1 PDSCH 972 for the first beam (b1) and the second SIB1 PDSCH 974 for the second beam (b2) based on the first SIB1 PDSCH length, the third SIB1 PDSCH 982 for the third beam (b3), and the fourth SIB1 PDSCH 986 for the fourth beam (b4) based on the second SIB1 PDSCH length, the first additional message 974 for the first beam (b1) and the second additional message 978 for the second beam (b2) based on the first additional time, and the third additional message 984 for the third beam (b3) and the fourth additional message 988 for the fourth beam (b4) based on the second additional time.

In another aspect, one or more parameters of the SIB PDSCH cluster may be configured to be beam specific. That is, one or more parameters may be configured to be specific for each SIB PDSCH of each beam. In one aspect, the SSB/CORESET cluster 900 may indicate or configure a beam specific SIB1 PDSCH length and a beam specific additional time respectively for the SIB1 PDSCHs 972, 976, 982, and 986 and the additional messages 974, 978, 984, and 988 of the first beam (b1), the second beam (b2), the third beam (b3), and the fourth beam (b4).

Figure 10:
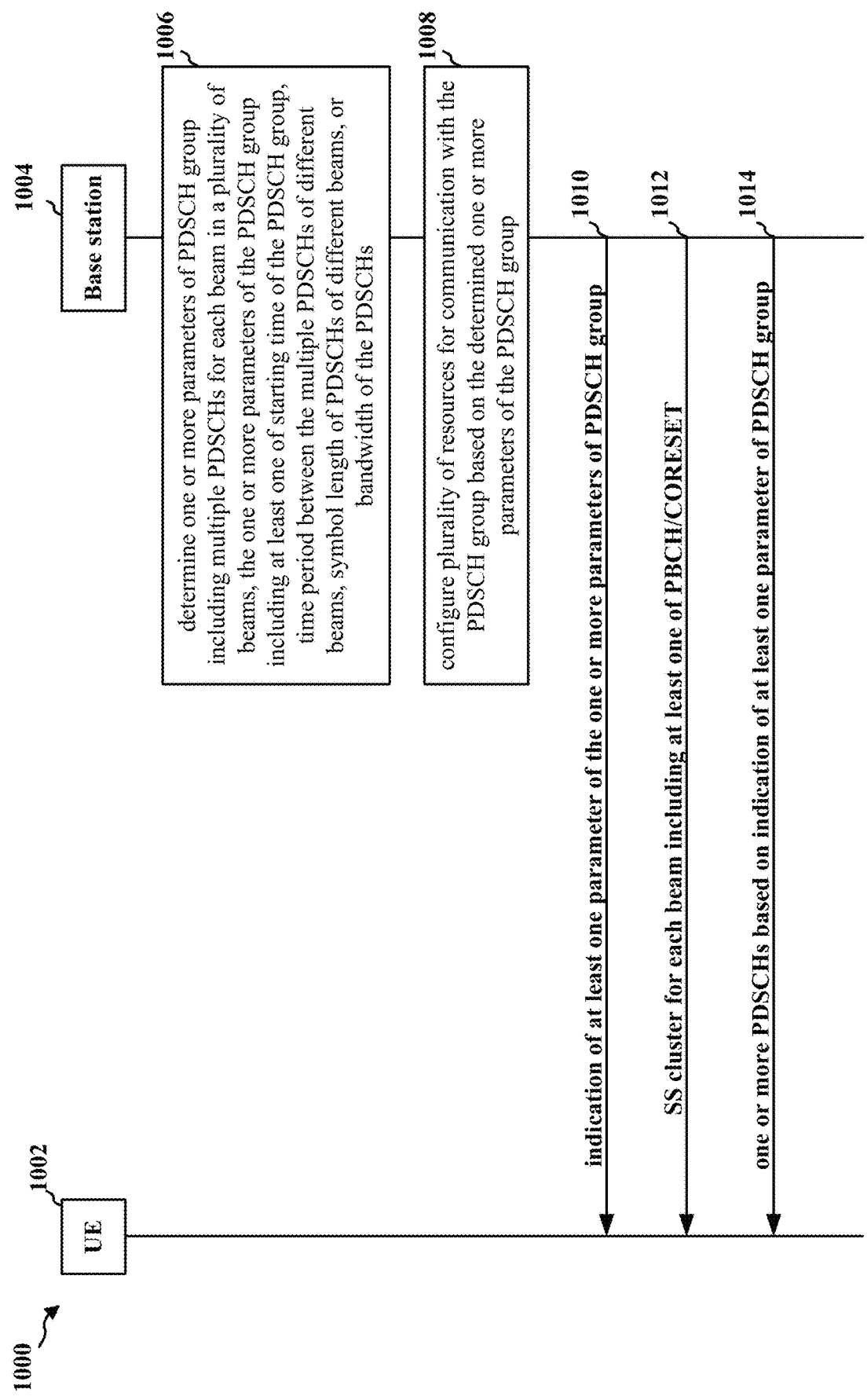
FIG. 10 is a communication diagram of a method of wireless communication.

FIG. 10 is a communication diagram 1000 of a method of wireless communication. The communication diagram 1000 includes a UE 1002 and a base station 1004.

At 1006, the base station may determine one or more parameters of a PDSCH group including multiple PDSCHs for each beam in a plurality of beams, the one or more parameters of the PDSCH group including at least one of a starting time of the PDSCH group, a time period between the multiple PDSCHs of different beams in the plurality of beams, a symbol length of PDSCHs of different beams in the plurality of beams, or a bandwidth of the PDSCHs.

In one aspect, the time period between the multiple PDSCHs of different beams may include beam switching gaps of the plurality of beams. In one aspect, at least one parameter of one or more parameters of the PDSCH group may be preconfigured or predefined.

At 1008, the base station may configure a plurality of resources for communication via the PDSCH group based on the determined one or more parameters of the PDSCH group.

In some aspects, the PDSCH group may include a system information block (SIB) PDSCH.

At 1010, the base station may transmit, to a UE, an indication of at least one parameter of the one or more parameters of the PDSCH group for communication via the plurality of resources. The UE may receive, from the base station, the indication of at least one parameter of the one or more parameters of the PDSCH group for communication via the plurality of resources. In one aspect, at least one indication of at least one parameter of the one or more parameters of the PDSCH group may include an index to a set of one or more parameters.

In one aspect, at least one indication of at least one parameter of the one or more parameters of the PDSCH group may be configured for the plurality of beams. In another aspect, at least one indication of at least one parameter of the one or more parameters of the PDSCH group may be configured for a subset of beams of the plurality of beams. In another aspect, at least one indication of at least one parameter of the one or more parameters of the PDSCH group may be configured specifically for each beam of the plurality of beams.

In one aspect, the starting time of the PDSCH group may include an absolute time domain value. In another aspect, the starting time of the PDSCH group may include a relative time domain value in reference to the SS cluster. In another aspect, the bandwidth of the PDSCH group may include an absolute frequency domain value. In another aspect, the bandwidth of the PDSCH group may include a relative time domain value in reference to the SS cluster.

At 1012, the base station may transmit, to the UE, an SS cluster for each beam in the plurality of beams, the SS cluster including at least one of a PBCH or a CORESET. The UE may receive, from the base station, the SS cluster for each beam in the plurality of beams. In some aspects, at least one of the PBCH or the CORESET includes at least one indication of at least one parameter of the one or more parameters of the PDSCH group.

At 1014, the base station may transmit, to the UE via the plurality of resources, one or more PDSCHs based on the at least one parameter of the one or more parameters of the PDSCH group transmitted to the UE. The UE may receive, from the base station via the plurality of resources, one or more PDSCHs based on the at least one parameter of the one or more parameters of the PDSCH group received from the base station.

Figure 11:
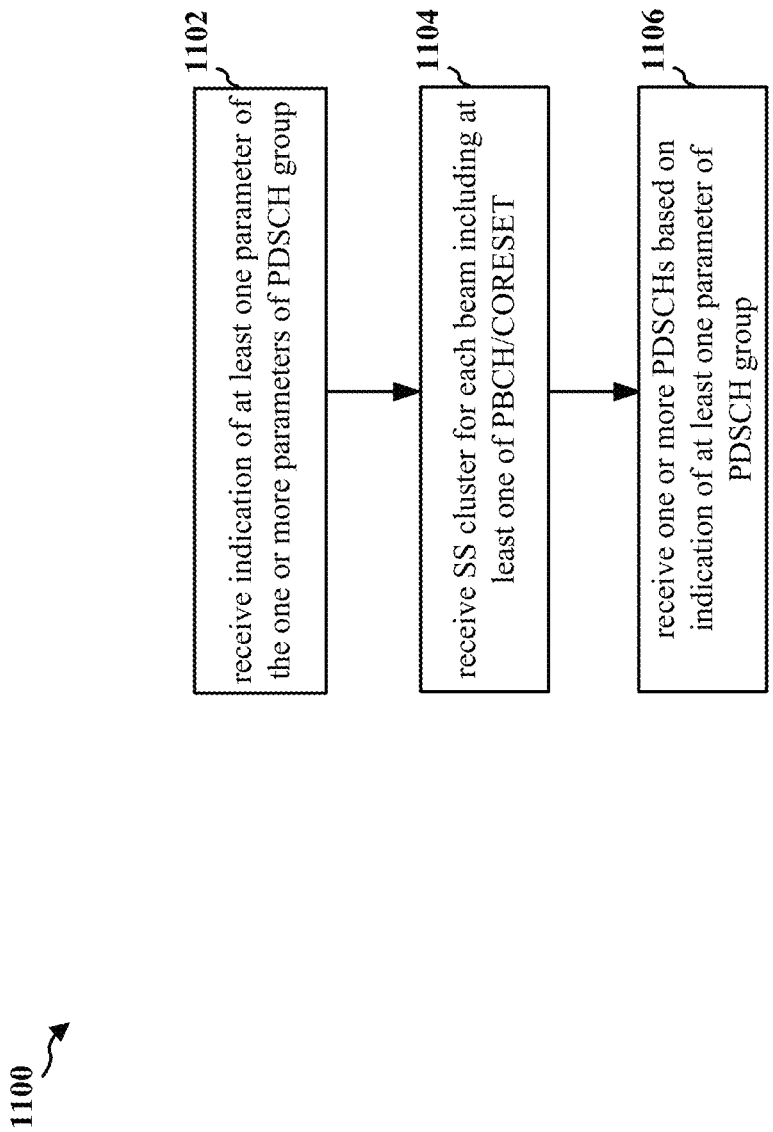
FIG. 11 is a flowchart of a method of wireless communication.

FIG. 11 is a flowchart 1100 of a method of wireless communication. The method may be performed by a UE (e.g., the UE 104/1002; the apparatus 1302).

At 1102, the UE may be configured to receive, from a base station, an indication of at least one parameter of the one or more parameters of the PDSCH group for communication via the plurality of resources. In one aspect, at least one indication of at least one parameter of the one or more parameters of the PDSCH group may include an index to a set of one or more parameters. For example, 1102 may be performed by a PDSCH group processing component 1340.

In one aspect, at least one indication of at least one parameter of the one or more parameters of the PDSCH group may be configured for the plurality of beams. In another aspect, at least one indication of at least one parameter of the one or more parameters of the PDSCH group may be configured for a subset of beams of the plurality of beams. In another aspect, at least one indication of at least one parameter of the one or more parameters of the PDSCH group may be configured specifically for each beam of the plurality of beams.

In one aspect, the starting time of the PDSCH group may include an absolute time domain value. In another aspect, the starting time of the PDSCH group may include a relative time domain value in reference to the SS cluster. In another aspect, the bandwidth of the PDSCH group may include an absolute frequency domain value. In another aspect, the bandwidth of the PDSCH group may include a relative time domain value in reference to the SS cluster.

At 1104, the UE may be configured to receive, from the base station, the SS cluster for each beam in the plurality of beams, the SS cluster including at least one of a PBCH or a CORESET. In some aspects, at least one of the PBCH or the CORESET includes at least one indication of at least one parameter of the one or more parameters of the PDSCH group. For example, 1104 may be performed by an SS cluster processing component 1342.

At 1106, the UE may be configured to receive, from the base station via the plurality of resources, one or more PDSCHs based on the at least one parameter of the one or more parameters of the PDSCH group received from the base station. For example, 1106 may be performed by the PDSCH group processing component 1340.

Figure 12:
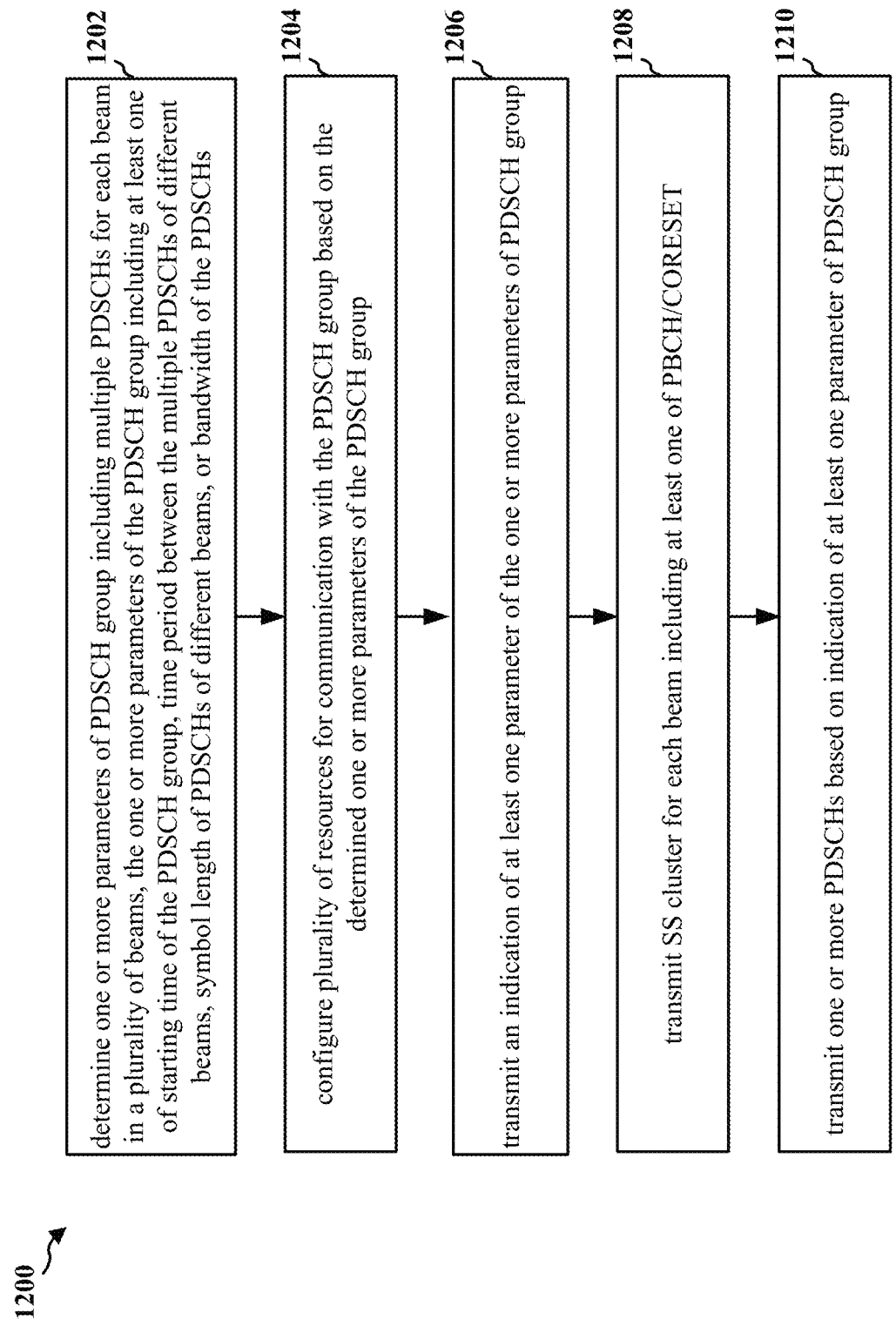
FIG. 12 is a flowchart of a method of wireless communication.

FIG. 12 is a flowchart 1200 of a method of wireless communication. The method may be performed by a base station (e.g., the base station 102/180; the apparatus 1402).

At 1202, the base station may be configured to determine one or more parameters of a PDSCH group including multiple PDSCHs for each beam in a plurality of beams, the one or more parameters of the PDSCH group including at least one of a starting time of the PDSCH group, a time period between the multiple PDSCHs of different beams in the plurality of beams, a symbol length of PDSCHs of different beams in the plurality of beams, or a bandwidth of the PDSCH group. In one aspect, the time period between the multiple PDSCHs of different beams may include beam switching gaps of the plurality of beams. In one aspect, at least one parameter of one or more parameters of the PDSCH group may be preconfigured or predefined. For example, 1202 may be performed by a PDSCH group managing component 1440.

At 1204, the base station may configure a plurality of resources for communication via the PDSCH group based on the determined one or more parameters of the PDSCH group. In some aspects, the PDSCH group may include a SIB PDSCH. For example, 1204 may be performed by the PDSCH group managing component 1440.

At 1206, the base station may be configured to transmit, to a UE, an indication of at least one parameter of the one or more parameters of the PDSCH group for communication via the plurality of resources. In one aspect, at least one indication of at least one parameter of the one or more parameters of the PDSCH group may include an index to a set of one or more parameters. For example, 1206 may be performed by the PDSCH group managing component 1440.

In one aspect, at least one indication of at least one parameter of the one or more parameters of the PDSCH group may be configured for the plurality of beams. In another aspect, at least one indication of at least one parameter of the one or more parameters of the PDSCH group may be configured for a subset of beams of the plurality of beams. In another aspect, at least one indication of at least one parameter of the one or more parameters of the PDSCH group may be configured specifically for each beam of the plurality of beams.

In one aspect, the starting time of the PDSCH group may include an absolute time domain value. In another aspect, the starting time of the PDSCH group may include a relative time domain value in reference to the SS cluster. In another aspect, the bandwidth of the PDSCH group may include an absolute frequency domain value. In another aspect, the bandwidth of the PDSCH group may include a relative time domain value in reference to the SS cluster.

At 1208, the base station may be configured to transmit, to the UE, an SS cluster for each beam in the plurality of beams, the SS cluster including at least one of a PBCH or a CORESET. In some aspects, at least one of the PBCH or the CORESET includes at least one indication of at least one parameter of the one or more parameters of the PDSCH group. For example, 1208 may be performed by an SS cluster managing component 1442.

At 1210, the base station may be configured to transmit, to the UE via the plurality of resources, one or more PDSCHs based on the at least one parameter of the one or more parameters of the PDSCH group transmitted to the UE. For example, 1210 may be performed by the PDSCH group managing component 1440.

Figure 13:
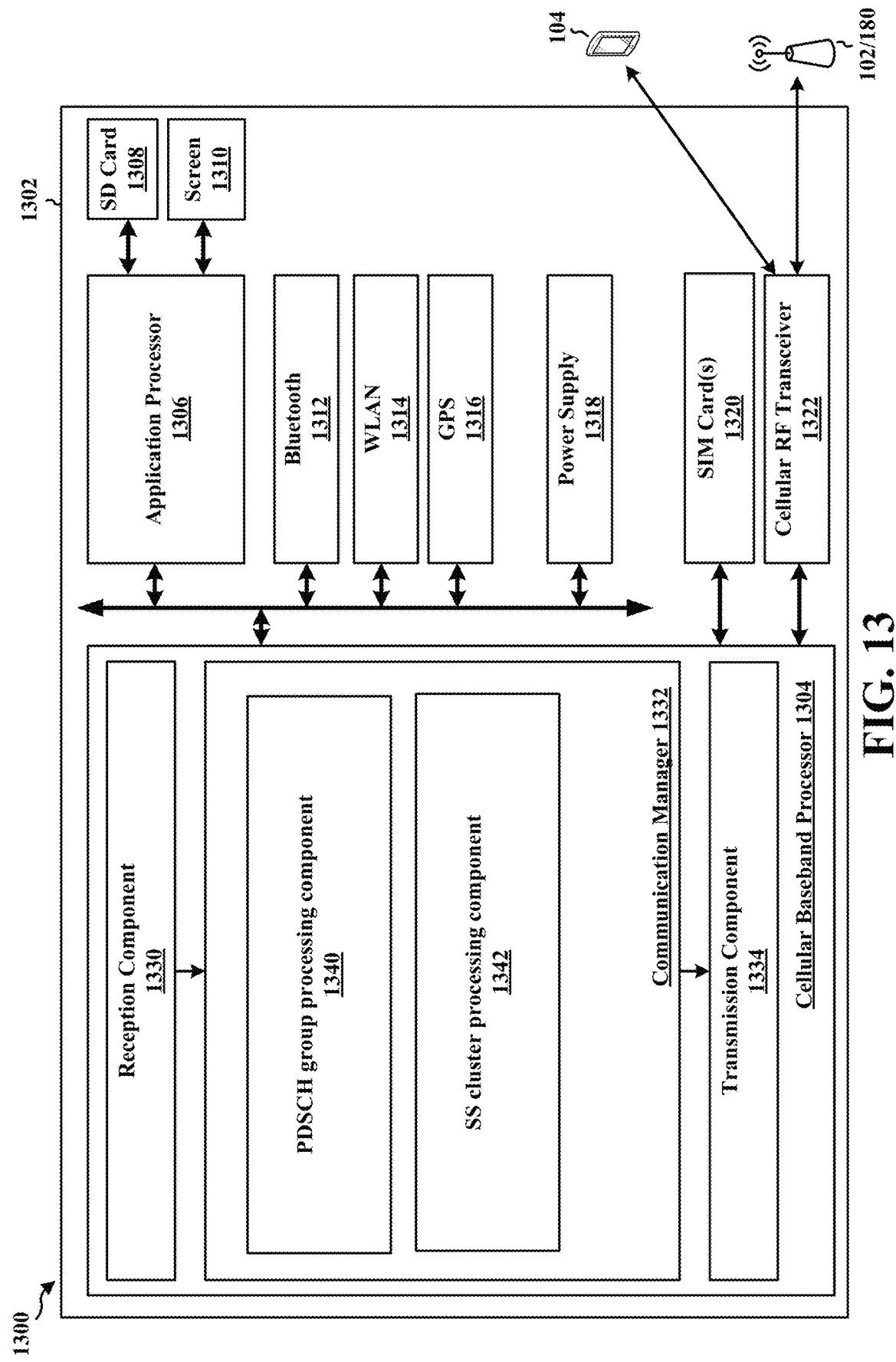
FIG. 13 is a diagram illustrating an example of a hardware implementation for an example apparatus.

FIG. 13 is a diagram 1300 illustrating an example of a hardware implementation for an apparatus 1302. The apparatus 1302 is a UE and includes a cellular baseband processor 1304 (also referred to as a modem) coupled to a cellular RF transceiver 1322 and one or more subscriber identity modules (SIM) cards 1320, an application processor 1306 coupled to a secure digital (SD) card 1308 and a screen 1310, a Bluetooth module 1312, a wireless local area network (WLAN) module 1314, a Global Positioning System (GPS) module 1316, and a power supply 1318. The cellular baseband processor 1304 communicates through the cellular RF transceiver 1322 with the UE 104 and/or BS 102/180. The cellular baseband processor 1304 may include a computer-readable medium/memory. The computer-readable medium/memory may be non-transitory. The cellular baseband processor 1304 is responsible for general processing, including the execution of software stored on the computer-readable medium/memory. The software, when executed by the cellular baseband processor 1304, causes the cellular baseband processor 1304 to perform the various functions described supra. The computer-readable medium/memory may also be used for storing data that is manipulated by the cellular baseband processor 1304 when executing software. The cellular baseband processor 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the cellular baseband processor 1304. The cellular baseband processor 1304 may be a component of the UE 350 and may include the memory 360 and/or at least one of the TX processor 368, the RX processor 356, and the controller/processor 359. In one configuration, the apparatus 1302 may be a modem chip and include just the baseband processor 1304, and in another configuration, the apparatus 1302 may be the entire UE (e.g., see 350 of FIG. 3) and include the aforediscussed additional modules of the apparatus 1302.

The communication manager 1332 includes a PDSCH group processing component 1340 that is configured to receive an indication of at least one parameter of the one or more parameters of the PDSCH group for communication via the plurality of resources, and receive via the plurality of resources, one or more PDSCHs based on the at least one parameter of the one or more parameters of the PDSCH group, e.g., as described in connection with 1102 and 1106. The communication manager 1332 further includes an SS cluster processing component 1342 that is configured to receive, from the base station, the SS cluster for each beam in the plurality of beams, the SS cluster including at least one of a PBCH or a CORESET, e.g., as described in connection with 1104.

The apparatus may include additional components that perform each of the blocks of the algorithm in the aforementioned flowcharts of FIGS. 10 and 11. As such, each block in the aforementioned flowcharts of FIGS. 10 and 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1302, and in particular the cellular baseband processor 1304, includes means for receiving, from a base station, an indication of at least one parameter of a PDSCH group including multiple PDSCHs for each beam in a plurality of beams, and means for receiving, from the base station via a plurality of resources, one or more PDSCHs based on the indication of the at least one parameter of the PDSCH group. The apparatus 1302 includes means for receiving an SS cluster for each beam in the plurality of beams, the SS cluster including at least one of a PBCH or a CORESET. The aforementioned means may be one or more of the aforementioned components of the apparatus 1302 configured to perform the functions recited by the aforementioned means. As described supra, the apparatus 1302 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 14:
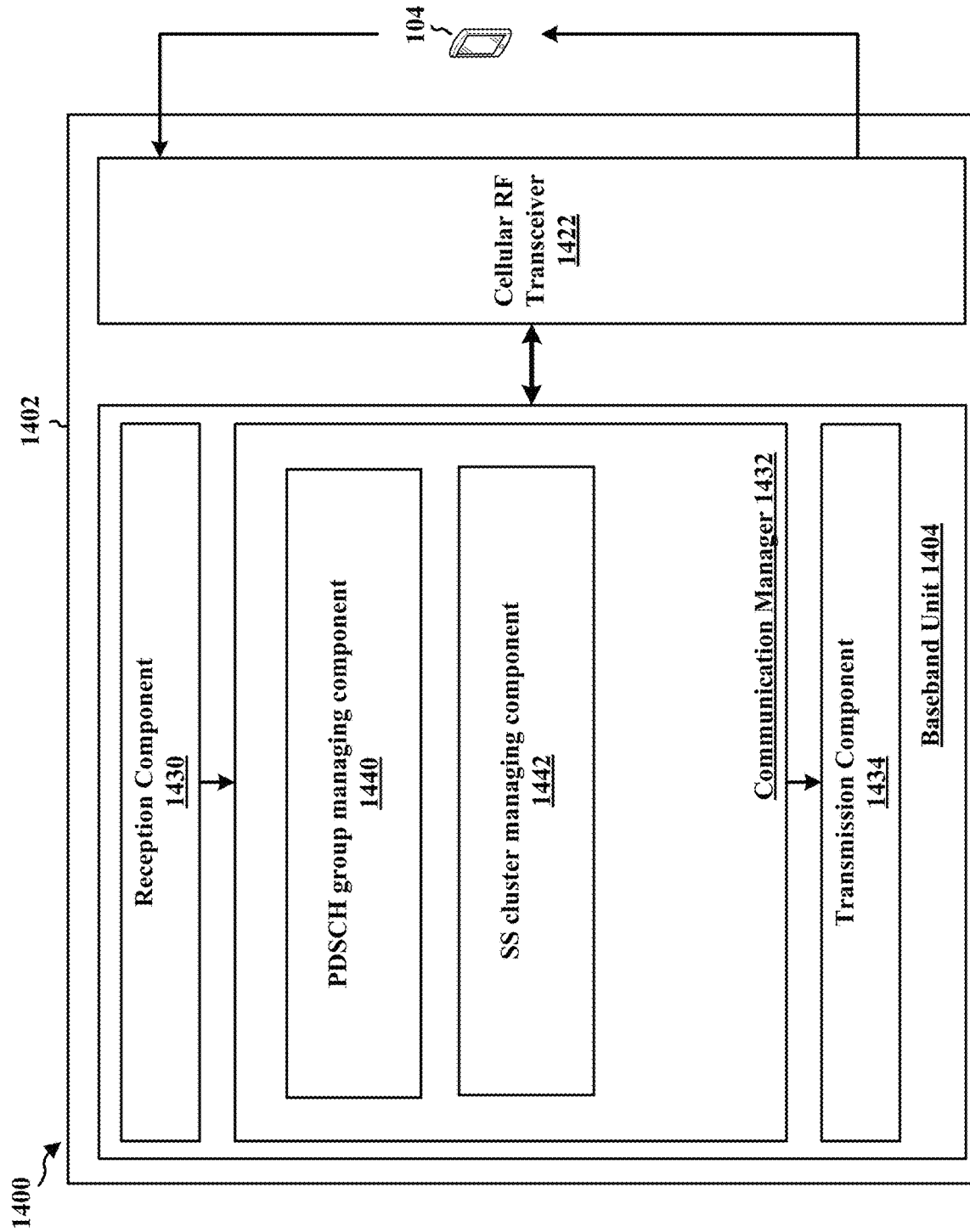
FIG. 14 is a diagram illustrating an example of a hardware implementation for an example apparatus.

FIG. 14 is a diagram 1400 illustrating an example of a hardware implementation for an apparatus 1402. The apparatus 1402 is a BS and includes a baseband unit 1404. The baseband unit 1404 may communicate through a cellular RF transceiver 1422 with the UE 104. The baseband unit 1404 may include a computer-readable medium/memory. The baseband unit 1404 is responsible for general processing, including the execution of software stored on the computer-readable medium/memory. The software, when executed by the baseband unit 1404, causes the baseband unit 1404 to perform the various functions described supra. The computer-readable medium/memory may also be used for storing data that is manipulated by the baseband unit 1404 when executing software. The baseband unit 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the baseband unit 1404. The baseband unit 1404 may be a component of the BS 310 and may include the memory 376 and/or at least one of the TX processor 316, the RX processor 370, and the controller/processor 375.

The communication manager 1432 includes a PDSCH group managing component 1440 that is configured to determine one or more parameters of a PDSCH group including multiple PDSCHs for each beam in a plurality of beams, configure a plurality of resources for communication via the PDSCH group based on the determined one or more parameters of the PDSCH group, transmit an indication of at least one parameter of the one or more parameters of the PDSCH group for communication via the plurality of resources, and transmit, to the UE via the plurality of resources, one or more PDSCHs based on the at least one parameter of the one or more parameters of the PDSCH group, e.g., as described in connection with 1202, 1204, 1206, and 1210. The communication manager 1432 further includes an SS cluster managing component 1442 that is configured to transmit an SS cluster for each beam in the plurality of beams, the SS cluster including at least one of a PBCH or a CORESET, e.g., as described in connection with 1208.

The apparatus may include additional components that perform each of the blocks of the algorithm in the aforementioned flowcharts of FIGS. 10 and 12. As such, each block in the aforementioned flowcharts of FIGS. 10 and 12 may be performed by a component, and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1402, and in particular the baseband unit 1404, includes means for determining one or more parameters of a PDSCH group including multiple PDSCHs for each beam in a plurality of beams, means for configuring a plurality of resources for communication via the PDSCH group based on the determined one or more parameters of the PDSCH group, and means for transmitting, to a UE), an indication of at least one parameter of the one or more parameters of the PDSCH group for communication via the plurality of resources. The apparatus 1402 includes means for transmitting, via the plurality of resources, one or more PDSCHs based on the at least one parameter of the one or more parameters of the PDSCH group. The apparatus 1402 includes means for transmitting an SS cluster for each beam in the plurality of beams, the SS cluster including at least one of a PBCH or a CORESET. The aforementioned means may be one or more of the aforementioned components of the apparatus 1402 configured to perform the functions recited by the aforementioned means. As described supra, the apparatus 1402 may include the TX Processor 316, the RX Processor 370, and the controller/ processor 375. As such, in one configuration, the aforementioned means may be the TX Processor 316, the RX Processor 370, and the controller/processor 375 configured to perform the functions recited by the aforementioned means.

A base station may determine one or more parameters of a PDSCH group including multiple PDSCHs for each beam in a plurality of beams, the one or more parameters of the PDSCH group including at least one of a starting time of the PDSCH group, a time period between the multiple PDSCHs of different beams in the plurality of beams, a symbol length of PDSCHs of different beams in the plurality of beams, or a bandwidth of the PDSCH group, configure a plurality of resources for communication via the PDSCH group based on the determined one or more parameters of the PDSCH group, and transmit, to a UE, an indication of at least one parameter of the one or more parameters of the PDSCH group for communication via the plurality of resources. The base station may also transmit, to the UE via the plurality of resources, one or more PDSCHs based on the at least one parameter of the one or more parameters of the PDSCH group.

The UE may receive, from the base station, the indication of at least one parameter of the PDSCH group including multiple PDSCHs for each beam in a plurality of beams, and receive, from the base station via the plurality of resources, one or more PDSCHs based on the indication of the at least one parameter of the PDSCH group.

In one aspect, the PDSCH group may include a SIB PDSCH. In one aspect, the time period between the multiple PDSCHs of different beams may include beam switching gaps of the plurality of beams. In one aspect, at least one parameter of one or more parameters of the PDSCH group may be preconfigured or predefined.

The base station may further transmit, to the UE, an SS cluster for each beam in the plurality of beams, the SS cluster including at least one of a PBCH or a CORESET. The UE may receive, from the base station, the SS cluster for each beam in the plurality of beams.

In one aspect, at least one of the PBCH or the CORESET may include at least one indication of at least one parameter of the one or more parameters of the PDSCH group. In another aspect, at least one indication of at least one parameter of the one or more parameters of the PDSCH group is configured for the plurality of beams. In another aspect, at least one indication of at least one parameter of the one or more parameters of the PDSCH group is configured for a subset of beams of the plurality of beams. In another aspect, at least one indication of at least one parameter of the one or more parameters of the PDSCH group is configured specifically for each beam of the plurality of beams.

In one aspect, at least one indication of at least one parameter of the one or more parameters of the PDSCH group may include an index to a set of one or more parameters. In another aspect, the starting time of the PDSCH group may include an absolute time domain value. In another aspect, the starting time of the PDSCH group may include a relative time domain value in reference to the SS cluster. In one aspect, the bandwidth of the PDSCH group may include an absolute frequency domain value. In another aspect, the bandwidth of the PDSCH group may include a relative time domain value in reference to the SS cluster.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a base station, the method including determining one or more parameters of a PDSCH group including multiple PDSCHs for each beam in a plurality of beams, the one or more parameters of the PDSCH group including at least one of a starting time of the PDSCH group, a time period between the multiple PDSCHs of different beams in the plurality of beams, a symbol length of PDSCHs of different beams in the plurality of beams, or a bandwidth of the PDSCH group, configuring a plurality of resources for communication via the PDSCH group based on the determined one or more parameters of the PDSCH group, and transmitting, to a UE, an indication of at least one parameter of the one or more parameters of the PDSCH group for communication via the plurality of resources.

Aspect 2 is the method of aspect 1, where the PDSCH group includes a SIB PDSCH.

Aspect 3 is the method of any of aspects 1 and 2, further including transmitting, to the UE via the plurality of resources, one or more PDSCHs based on the at least one parameter of the one or more parameters of the PDSCH group.

Aspect 4 is the method of any of aspects 1 to 3, where the time period between the multiple PDSCHs of different beams includes beam switching gaps of the plurality of beams.

Aspect 5 is the method of any of aspects 1 to 4, where at least one parameter of the one or more parameters of the PDSCH group is predefined.

Aspect 6 is the method of any of aspects 1 to 5, further including transmitting, to the UE, an SS cluster for each beam in the plurality of beams, the SS cluster including at least one of a PBCH or a CORESET, where at least one of the PBCH or the CORESET includes at least one indication of at least one parameter of the one or more parameters of the PDSCH group.

Aspect 7 is the method of aspect 6, where at least one indication of at least one parameter of the one or more parameters of the PDSCH group is configured for the plurality of beams.

Aspect 8 is the method of aspect 6, where at least one indication of at least one parameter of the one or more parameters of the PDSCH group is configured for a subset of beams of the plurality of beams.

Aspect 9 is the method of aspect 6, where at least one indication of at least one parameter of the one or more parameters of the PDSCH group is configured specifically for each beam of the plurality of beams.

Aspect 10 is the method of aspect 6, where at least one indication of at least one parameter of the one or more parameters of the PDSCH group includes an index to a set of one or more parameters.

Aspect 11 is the method of any of aspects 6 to 10, where the starting time of the PDSCH group includes an absolute time domain value.

Aspect 12 is the method of any of aspects 6 to 10, where the starting time of the PDSCH group includes a relative time domain value in reference to the SS cluster.

Aspect 13 is the method of any of aspects 6 to 10, where the bandwidth of the PDSCH group includes an absolute frequency domain value.

Aspect 14 is the method of any of aspects 6 to 10, where the bandwidth of the PDSCH group includes a relative time domain value in reference to the SS cluster.

Aspect 15 is an apparatus for wireless communication including at least one processor coupled to a memory and configured to implement a method as in any of aspects 1 to 14.

Aspect 16 is an apparatus for wireless communication including means for implementing a method as in any of aspects 1 to 14.

Aspect 17 is a computer-readable medium storing computer executable code, where the code when executed by a processor causes the processor to implement a method as in any of aspects 1 to 14.

Aspect 18 is a method of wireless communication at a UE, the method including receiving, from a base station, an indication of at least one parameter of a PDSCH group including multiple PDSCHs for each beam in a plurality of beams, the at least one parameter of the PDSCH group including at least one of a starting time of the PDSCH group, a time period between PDSCHs of different beams in the plurality of beams, a symbol length of PDSCHs of different beams in the plurality of beams, or a bandwidth of the PDSCH group, and receiving, from the base station via a plurality of resources, one or more PDSCHs based on the indication of the at least one parameter of the PDSCH group.

Aspect 19 is the method of aspect 18, where the PDSCH group includes a SIB PDSCH.

Aspect 20 is the method of any of aspects 18 and 19, where the time period between the multiple PDSCHs of different beams includes beam switching gaps of the plurality of beams.

Aspect 21 is the method of any of aspects 18 to 20, where at least one parameter of the PDSCH group is predefined.

Aspect 22 is the method of any of aspects 18 to 21, further including receiving, from the base station, an SS cluster for each beam in the plurality of beams, the SS cluster including at least one of a PBCH or a CORESET, where at least one of the PBCH or the CORESET includes at least one indication of at least one parameter of the PDSCH group.

Aspect 23 is the method of aspect 22, where at least one indication of at least one parameter of the PDSCH group is configured for the plurality of beams.

Aspect 24 is the method of aspect 22, where at least one indication of at least one parameter of the PDSCH group is configured for a subset of beams of the plurality of beams.

Aspect 25 is the method of aspect 22, where at least one indication of at least one parameter of the PDSCH group is configured specifically for each beam of the plurality of beams.

Aspect 26 is the method of aspect 22, where at least one indication of at least one parameter of the PDSCH group includes an index to a set of one or more parameters.

Aspect 27 is the method of any of aspects 22 to 26 where the starting time of the PDSCH group includes an absolute time domain value.

Aspect 28 is the method of any of aspects 22 to 26, where the starting time of the PDSCH group includes a relative time domain value in reference to the SS cluster.

Aspect 29 is the method of any of aspects 22 to 28 where the bandwidth of the PDSCH group includes an absolute frequency domain value.

Aspect 30 is the method of any of aspects 22 to 28 where the bandwidth of the PDSCH group includes a relative time domain value in reference to the SS cluster.

Aspect 31 is an apparatus for wireless communication including at least one processor coupled to a memory and configured to implement a method as in any of aspects 18 to 30.

Aspect 32 is an apparatus for wireless communication including means for implementing a method as in any of aspects 18 to 30.

Aspect 33 is a computer-readable medium storing computer executable code, where the code when executed by a processor causes the processor to implement a method as in any of aspects 18 to 30.

What is claimed is:

1. An apparatus for wireless communication at a base station, comprising:
a memory; and
at least one processor coupled to the memory and configured to:
determine one or more parameters of a system information block (SIB) physical downlink shared channel (PDSCH) group including multiple SIB PDSCHs for a plurality of beams, each beam in the plurality of beams corresponding to one of the multiple SIB PDSCHs, the one or more parameters of the SIB PDSCH group including at least one of a starting time of the SIB PDSCH group, a time period between the multiple SIB PDSCHs of different beams in the plurality of beams, a symbol length of SIB PDSCHs of different beams in the plurality of beams, or a bandwidth of the SIB PDSCH group;
configure a plurality of resources for communication via the SIB PDSCH group based on the determined one or more parameters of the SIB PDSCH group; and
transmit, to a user equipment (UE), an indication of at least one parameter of the one or more parameters of the SIB PDSCH group for communication via the plurality of resources.

2. The apparatus of claim 1, wherein the at least one processor is further configured to transmit, to the UE via the plurality of resources, one or more SIB PDSCHs based on the at least one parameter of the one or more parameters of the SIB PDSCH group.

3. The apparatus of claim 1, wherein the time period between the multiple SIB PDSCHs of different beams includes beam switching gaps of the plurality of beams.

4. The apparatus of claim 1, wherein the at least one parameter of the one or more parameters of the SIB PDSCH group is predefined.

5. The apparatus of claim 1, wherein the at least one processor is further configured to transmit, to the UE, a synchronization signal (SS) cluster for each beam in the plurality of beams, the SS cluster including at least one of a physical broadcast channel (PBCH) or a control resource set (CORESET),
wherein the at least one of the PBCH or the CORESET includes at least one indication of the at least one parameter of the one or more parameters of the SIB PDSCH group.

6. The apparatus of claim 5, wherein the at least one indication of the at least one parameter of the one or more parameters of the SIB PDSCH group is configured for the plurality of beams.

7. The apparatus of claim 5, wherein the at least one indication of the at least one parameter of the one or more parameters of the SIB PDSCH group is configured for a subset of beams of the plurality of beams.

8. The apparatus of claim 5, wherein the at least one indication of the at least one parameter of the one or more parameters of the SIB PDSCH group is configured specifically for each beam of the plurality of beams.

9. The apparatus of claim 5, wherein the at least one indication of the at least one parameter of the one or more parameters of the SIB PDSCH group includes an index to a set of one or more parameters.

10. The apparatus of claim 5, wherein the starting time of the SIB PDSCH group includes an absolute time domain value.

11. The apparatus of claim 5, wherein the starting time of the SIB PDSCH group includes a relative time domain value in reference to the SS cluster.

12. The apparatus of claim 5, wherein the bandwidth of the SIB PDSCH group includes an absolute frequency domain value.

13. The apparatus of claim 5, wherein the bandwidth of the SIB PDSCH group includes a relative time domain value in reference to the SS cluster.

14. A method of wireless communication at a base station, comprising:
determining one or more parameters of a system information block (SIB) physical downlink shared channel (PDSCH) group including multiple SIB PDSCHs for a plurality of beams, each beam in the plurality of beams corresponding to one of the multiple SIB PDSCHs, the one or more parameters of the SIB PDSCH group including at least one of a starting time of the SIB PDSCH group, a time period between the multiple SIB PDSCHs of different beams in the plurality of beams, a symbol length of SIB PDSCHs of different beams in the plurality of beams, or a bandwidth of the SIB PDSCH group;

configuring a plurality of resources for communication via the SIB PDSCH group based on the determined one or more parameters of the SIB PDSCH group; and transmitting, to a user equipment (UE), an indication of at least one parameter of the one or more parameters of the SIB PDSCH group for communication via the plurality of resources.

15. The method of claim 14, further comprising transmitting, to the UE via the plurality of resources, one or more SIB PDSCHs based at least one parameter of the one or more parameters of the on the SIB PDSCH group.

16. An apparatus for wireless communication at a user equipment (UE), comprising:
a memory; and
at least one processor coupled to the memory and configured to:
receive, from a base station, an indication of at least one parameter of a system information block (SIB) physical downlink shared channel (PDSCH) group including multiple SIB PDSCHs for a plurality of beams, each beam in the plurality of beams corresponding to one of the multiple SIB PDSCHs, the at least one parameter of the SIB PDSCH group including at least one of a starting time of the SIB PDSCH group, a time period between SIB PDSCHs of different beams in the plurality of beams, a symbol length of SIB PDSCHs of different beams in the plurality of beams, or a bandwidth of the SIB PDSCH group; and
receive, from the base station via a plurality of resources, one or more SIB PDSCHs based on the indication of the at least one parameter of the SIB PDSCH group.

17. The apparatus of claim 16, wherein the time period between the multiple SIB PDSCHs of different beams includes beam switching gaps of the plurality of beams.

18. The apparatus of claim 16, wherein the at least one parameter of the SIB PDSCH group is predefined.

19. The apparatus of claim 16, wherein the at least one processor is further configured to receive, from the base station, a synchronization signal (SS) cluster for each beam in the plurality of beams, the SS cluster including at least one of a physical broadcast channel (PBCH) or a control resource set (CORESET),
wherein the at least one of the PBCH or the CORESET includes at least one indication of the at least one parameter of the SIB PDSCH group.

20. The apparatus of claim 19, wherein the at least one indication of the at least one parameter of the SIB PDSCH group is configured for the plurality of beams.

21. The apparatus of claim 19, wherein the at least one indication of the at least one parameter of the SIB PDSCH group is configured for a subset of beams of the plurality of beams.

22. The apparatus of claim 19, wherein the at least one indication of the at least one parameter of the SIB PDSCH group is configured specifically for each beam of the plurality of beams.

23. The apparatus of claim 19, wherein the at least one indication of the at least one parameter of the SIB PDSCH group includes an index to a set of one or more parameters.

24. The apparatus of claim 19, wherein the starting time of the SIB PDSCH group includes an absolute time domain value.

25. The apparatus of claim 19, wherein the starting time of the SIB PDSCH group includes a relative time domain value in reference to the SS cluster.

26. The apparatus of claim 19, wherein the bandwidth of the SIB PDSCH group includes an absolute frequency domain value.

27. The apparatus of claim 19, wherein the bandwidth of the SIB PDSCH group includes a relative time domain value in reference to the SS cluster.

28. A method of wireless communication at a user equipment (UE), comprising:
receiving, from a base station, an indication of at least one parameter of a system information block (SIB) physical downlink shared channel (PDSCH) group including multiple SIB PDSCHs for a plurality of beams, each beam in the plurality of beams corresponding to one of the multiple SIB PDSCHs, the at least one parameter of the SIB PDSCH group including at least one of a starting time of the SIB PDSCH group, a time period between SIB PDSCHs of different beams in the plurality of beams, a symbol length of SIB PDSCHs of different beams in the plurality of beams, or a bandwidth of the SIB PDSCH group; and
receiving, from the base station via a plurality of resources, one or more SIB PDSCHs based on the indication of the at least one parameter of the SIB PDSCH group.

* * * * *